(12) United States Patent
Wass et al.

(10) Patent No.: US 10,887,927 B2
(45) Date of Patent: Jan. 5, 2021

(54) EVOLVED PACKET SYSTEM (EPS) BEARER IDENTITY BASED ACTIVE FLAG EXTENSION FOR CELLULAR INTERNET OF THINGS (CIOT) DEVICES

(71) Applicant: Telefonaktiebolaget LM Ericsson (publ), Stockholm (SE)

(72) Inventors: Mikael Wass, Sätilä (SE); Peter Hedman, Helsingborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 120 days.

(21) Appl. No.: 16/302,070

(22) PCT Filed: May 16, 2017

(86) PCT No.: PCT/EP2017/061723
§ 371 (c)(1),
(2) Date: Nov. 15, 2018

(87) PCT Pub. No.: WO2017/198663
PCT Pub. Date: Nov. 23, 2017

(65) Prior Publication Data
US 2019/0182873 A1    Jun. 13, 2019

Related U.S. Application Data

(60) Provisional application No. 62/337,050, filed on May 16, 2016.

(51) Int. Cl.
*H04W 76/10* (2018.01)
*H04W 76/12* (2018.01)
(Continued)

(52) U.S. Cl.
CPC .......... *H04W 76/10* (2018.02); *H04W 60/00* (2013.01); *H04W 76/12* (2018.02); *H04W 76/25* (2018.02); *H04W 76/20* (2018.02); *H04W 76/22* (2018.02)

(58) Field of Classification Search
CPC ..... H04W 76/10; H04W 76/12; H04W 76/19; H04W 76/20; H04W 76/22; H04W 76/25; H04W 60/00
See application file for complete search history.

(56) References Cited

U.S. PATENT DOCUMENTS

| 2011/0103310 A1* | 5/2011 | Stojanovski | H04L 12/66 370/328 |
| 2011/0170517 A1* | 7/2011 | Bakker | H04W 36/0033 370/331 |

(Continued)

FOREIGN PATENT DOCUMENTS

WO   2010/078255 A1   7/2010

OTHER PUBLICATIONS

Qualcomm Incorporated et al., "Simultaneous support for CP and UP optimisation", SA WG2 Meeting #114, S2-162058 (Revision of S2-161518), Sophia Antipolis, France, Apr. 11-15, 2016, Change Request (32 pages).

(Continued)

Primary Examiner — Kevin D Mew
(74) Attorney, Agent, or Firm — Rothwell, Figg, Ernst & Manbeck, P.C.

(57) ABSTRACT

A method performed in a communications network includes receiving, from a wireless communication device, such as for example, a user equipment (UE), an indication including the EPS bearer identity (EBI) the UE has determined to use for a pending uplink (UL) of user data. The indication indicates a preference of the UE to use an existing CP connection or to establish a UP ON connection for the (Continued)

pending UL of user data. The indication is included in a Tracking Area Update (TAU) request initiated by the UE. The method further includes determining, in response to receiving the indication, that the user plane (UP) connection does not need to be established and that the existing control plane (CP) connection may be used. The method further includes, in response to determining that the existing CP connection may be used, allowing the UE to send the pending UL of user data on the existing CP connection.

21 Claims, 8 Drawing Sheets

(51) Int. Cl.
    *H04W 60/00*     (2009.01)
    *H04W 76/25*     (2018.01)
    *H04W 76/22*     (2018.01)
    *H04W 76/20*     (2018.01)

(56) References Cited

U.S. PATENT DOCUMENTS

| | | | | |
|---|---|---|---|---|
| 2012/0093086 A1* | 4/2012 | Yin | ......................... | H04L 69/16 370/328 |
| 2013/0308527 A1* | 11/2013 | Chin | ..................... | H04W 36/38 370/328 |
| 2014/0016614 A1* | 1/2014 | Velev | ................. | H04W 36/165 370/331 |
| 2014/0169330 A1* | 6/2014 | Rommer | ............... | H04W 36/08 370/331 |
| 2014/0219248 A1* | 8/2014 | Reddiboyana | ........ | H04W 76/15 370/331 |
| 2014/0242962 A1* | 8/2014 | Choi | ..................... | H04W 8/245 455/418 |
| 2015/0056986 A1* | 2/2015 | Kim | ..................... | H04L 65/103 455/432.1 |
| 2015/0208281 A1* | 7/2015 | Kim | ..................... | H04W 28/12 370/235 |
| 2016/0007316 A1* | 1/2016 | Vaidya | ................ | H04W 64/003 370/312 |
| 2016/0073291 A1* | 3/2016 | Kim | ..................... | H04W 60/06 455/422.1 |
| 2016/0127884 A1* | 5/2016 | Kim | ........................ | H04W 8/02 455/435.2 |
| 2016/0142860 A1* | 5/2016 | Kim | ........................ | H04W 4/70 455/435.1 |
| 2016/0219605 A1* | 7/2016 | Karlsson | ................ | H04W 72/10 |
| 2016/0286385 A1* | 9/2016 | Ryu | ..................... | H04W 68/02 |
| 2017/0126618 A1* | 5/2017 | Bhaskaran | .......... | H04L 61/2015 |

OTHER PUBLICATIONS

Vodafone et al., "Support for rate control of CIoT data", SA WG2 Meeting #115, S2-162868 (rev S2-162838, rev S2-162710, rev S2-162054), Nanjing, P.R. China, May 23-27, 2016, Change Request (14 pages).

International Search Report and Written Opinion issued in International Application No. PCT/EP2017/061723, dated Aug. 30, 2018, 17 pages.

3GPP Draft, LG Electronics, "Active flag handling for CP solution", SA WG2 Meeting S2#114, S2-161547, Sophia Antipolis, France, Apr. 11-15, 2016, 2 pages.

3GPP Draft, LG Electronics, "Active flag handling for Control Plane CIoT Optimization", SA WG2 Meeting #114, S2-161548, Sophia Antipolis, France, Apr. 11-15, 2016, 18 pages.

3GPP, Ericsson, "Active flag handling for Control Plane CIoT Optimization", SA WG2 Meeting #115, S2-162488, Nanjing, P.R. China, May 23-27, 2016, 19 pages.

3GPP TS 23.401 V13.6.1 (Mar. 2016), 3rd Generation Partnership Project; Technical Specification Group Services and System Aspects; General Packet Radio Service (GPRS) enhancements for Evolved Universal Terrestrial Radio Access Network (E-UTRAN) access (Release 13), 365 pages.

3GPP TS 23.402 V13.5.0 (Mar. 2016), 3rd Generation Partnership Project; Technical Specification Group Services and System Aspects; Architecture enhancements for non-3GPP accesses (Release 13), 299 pages.

* cited by examiner

EVOLVED PACKET SYSTEM (EPS) BEARER IDENTITY BASED ACTIVE FLAG EXTENSION FOR CELLULAR INTERNET OF THINGS (CIOT) DEVICES

CROSS REFERENCE TO RELATED APPLICATION(S)

This application is a 35 U.S.C. § 371 National Stage of International Patent Application No. PCT/EP2017/061723, filed May 16, 2017, designating the United States and claiming priority to U.S. provisional application No. 62/337,050, filed on May 16, 2016, which is incorporated by this reference.

TECHNICAL FIELD

This disclosure relates generally to Cellular Internet of Things (CIoT) optimization and, more particularly, to methods and network nodes for handling additional wireless communication device activity in conjunction with tracking area updates (TAUs).

BACKGROUND

When a Tracking Area Update (TAU) procedure is successfully completed, an Active_flag in the Attach Request triggers user plane setup by the Mobility Management Entity (MME). However, for Mobile Originated (MO) delivery of user data via Control Plane, CIoT EPS optimization does not require user plane setup. Thus, in existing systems and methods, unnecessary user plane setup occurs and the UE power consumption is increased and resources are wasted.

Accordingly, there is a need for improved handling of the Active_Flag for TAU procedures.

SUMMARY

According to one aspect of the present invention, a method performed in a communications network includes receiving, from a wireless communication device, such as for example, a user equipment (UE), an indication including the EPS bearer identity (EBI) the UE has determined to use for a pending uplink (UL) of user data, wherein the indication indicates a preference of the UE to use an existing CP connection or to establish a UP connection for the pending UL of user data and wherein the indication is included in a Tracking Area Update (TAU) request initiated by the UE. The method further includes determining, in response to receiving the indication, that a user plane (UP) connection does not need to be established and that an existing control plane (CP) connection may be used. The method further includes, in response to determining that the existing CP connection may be used, allowing the UE to send the pending UL of user data on the existing CP connection.

According to another aspect of the present invention, a method performed in a communications network includes receiving, from a user equipment (UE), an indication including the EBI the UE has determined to use for a pending uplink (UL) of user data. The indication indicates a preference of the UE to use an existing CP connection or to establish a UP connection for the pending UL of user data. The indication is included in a Tracking Area Update (TAU) request initiated by the UE. The method further includes determining, in response to receiving the indication, that a UP connection needs to be established. The method further includes in response to determining that the UP connection needs to be established, establishing the UP connection and allowing the UE to send the pending UL of user data on the established UP connection.

In some embodiments, the determining step is based in part on the indication including the EBI the UE has determined to use for a pending UL of user data. In some embodiments, the determining step is based in part on a history of prior user data uplinks from the UE. In some embodiments, allowing the UE to send the pending UL of user data on the existing CP connection comprises sending an indication to the UE that the existing CP connection may be used. In some embodiments, allowing the UE to send the pending UL of user data on the established UP connection comprises sending an indication to the UE that the established UP connection may be used. In some embodiments, the indication to the UE is included in a TAU Accept message. In some embodiments, the indication indicates the preference of the UE based on the presence or absence of an active flag input, based on a Boolean value, and/or based on an explicit value identifying either the existing CP connection or the UP connection.

According to another aspect of the present invention, a method performed in a user equipment (UE) includes preparing a TAU Request message including an indication including the EBI the UE has determined to use for a pending uplink (UL) of user data, wherein the indication indicates a preference of the UE to use an existing CP connection or to establish a UP connection for the pending UL of user data. The method further includes transmitting the TAU Request message. The method further includes in response to transmitting the TAU Request message, receiving a TAU Accept message. The method further includes determining whether to use an existing CP connection or a UP connection to send the pending UL of user data based at least in part on the TAU Accept message. The method further includes sending the pending UL of user data.

In some embodiments, the TAU Accept message includes an indication as to whether the existing CP connection or the UP connection is to be used and the determining whether to use the existing CP connection or the UP connection to send the pending UL of user data based at least in part on the TAU Accept message is further based on the indication as to whether the existing CP connection or the UP connection is to be used. In some embodiments, determining whether to use the existing CP connection or the UP connection to send the pending UL of user data based at least in part on the TAU Accept message includes determining to use the UP connection based on the UP connection being set up. In some embodiments, determining whether to use the existing CP connection or the UP connection to send the pending UL of user data based at least in part on the TAU Accept message includes determining to use the CP connection based on the UP connection not being set up.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

Figure 1:
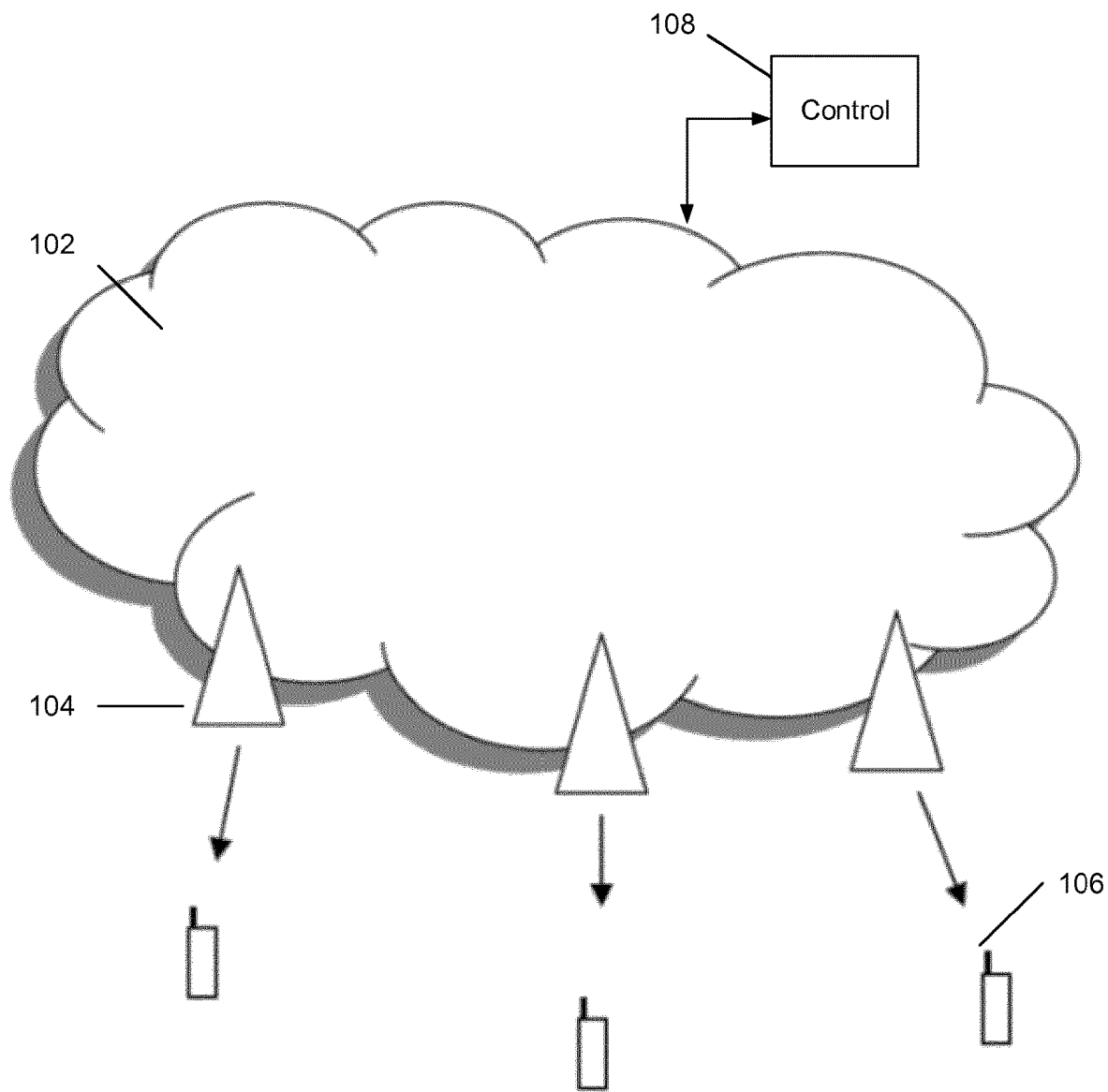
FIG. 1 is an illustration of a wireless communication system in accordance with exemplary embodiments.

The drawings are not necessarily to scale and the dimensions of certain features may have been exaggerated for the sake of clarity. Emphasis is instead placed upon illustrating the principle of the embodiments herein.

DETAILED DESCRIPTION

According to some embodiments, for Mobile Originated (MO) delivery via Control Plane, CIoT EPS optimization does not require user plane setup. Accordingly, the MME should not release the signaling connection so that the UE can send uplink data after receiving a TAU accept message. This may, for example, reduce unnecessary user plane setup.

With reference to change request CR 2995 (S2-162058) to TS 23.401 (titled "Simultaneous support for CP and UP optimisation"), allowing both CP and UP to be used for a packet data network (PDN) connection, there needs to be a decision whether to use CP or UP for the communication. The rate control change request to TS 23.401 CR 2999 (titled "Support for rate control of CIoT data") will indicate that the Serving Public Land Mobile Network (PLMN) Rate control is only applicable for CP only PDN connections. Consequently, if the UE decides whether to use CP or UP for communication via a PDN connection allowing both CP and UP, then there is limited possibility for the MME to protect itself (e.g., the MME would need to reject with back-off). Additionally, for example, if the UE decides that user plane connectivity should be established to transfer user data via that path, although there would be less impact to the MME because the data would be transferred via the eNB and SGW (and thus the MME can protect itself from high load on the CP), there is still a demand on the network (e.g., the eNB) to serve the UE requesting to transfer data via the UP.

Therefore, the indication from the UE should be a UE preference allowing the network taking a decision. One of ordinary skill in the art will understand that the UE preference may indicate a preference of an application that is the source of the data which determines the EBI, and that such an application may be in "higher layers" within the UE. A UE preference here includes the part of the UE that may have a preference for CP or UP as well as a preference of the application that is the source of the data which determines the connection to use and thereby the EBI.

If, in addition to the existing Active flag, an indication is added for which EBI the user data relates to, both the UE preferences and the network ability to control is achieved (according to some embodiments) as described below:

If the UE provides an "active flag," meaning that there is pending UP data, then the network must establish a UP connection.

If the UE provides "EBI," meaning that there is pending data on EBI and that the UE has a preference for the CP connection, then the network can decide whether to use the CP connection or to establish a UP connection. For example, if the EBI is CP only, then the network can decide to keep the signaling connection. If the EBI is UP only, then the network can establish a UP connection. If the EBI is either CP or UP, then the network can decide between the two, and in some embodiments may base this decision on the UE preference and/or history of prior UE connections.

If the UE provides "active flag" and "EBI" meaning that there is pending data on EBI and that the UE has a preference for the UP connection, then the network can decide whether to use the CP connection or to establish a UP connection. For example, if the EBI is CP only, then the network can decide to keep the signaling connection or to raise a rejection or error condition. If the EBI is UP only, then the network can establish a UP connection. If the EBI is either CP or UP, then the network can establish a UP connection.

Thus, according to some embodiments, the UE provides a new indication along with Active_flag that includes the EBI the UE has decided to use for its pending UL of user data. In some embodiments, the UE may indicate an explicit preference for using the CP connection. In these embodiments, the EBI together with the CP indication or UP indication (e.g., the existing active flag), similarly to above, allow the network to determine whether to use CP or UP for the pending UL of user data. As one of skill in the art will recognize, the UE may provide its preference for using the CP or UP in a number of ways (including directly or by providing other inputs through which the network can infer a preference), all of which may be employed by embodiments of the present invention.

In the context of the cellular Internet of Things (CIoT), there may be numerous devices which have relatively small amounts of data to communicate with the network relatively infrequently, and some of these devices may have short bursts of information that they need to communicate over the network. One of skill in the art will appreciate that embodiments of the present invention are particularly useful to improve network performance in this type of environment.

Referring to FIG. 1, a wireless communication deployment 100 in accordance with exemplary embodiments includes an access node 104 serving a wireless communication device (WCD) 106. Examples of WCDs include, but are not limited to, mobile telephones, user equipments (UEs), personal digital assistants, electronic readers, portable electronic tablets, wireless sensors, machine communication devices, personal computers, and laptop computers. Furthermore, the device 106 may be a legacy UE or dynamic TDD capable UE. Access node 104 may be, for example, a base station, an eNodeB, relay node, or gateway type device, and is capable of communicating with device 106, along with any additional elements suitable to support wireless communication between wireless communication devices or between a wireless communication device and another communication device, such as landline telephone. The access node 104 may be in communication with, for instance via a network 102, one or more control nodes 108, such as a Radio Network Controller (RNC), a Mobility Management Entity (MME), a Mobile Switching Center (MSC) or Base Station Subsystem (BSS). Although node 108 is explicitly identified as a control node, each of nodes 104, 106, and 108 may be understood as a "control" node to the extent that it includes a control unit or otherwise implements control functions.

Figure 2:
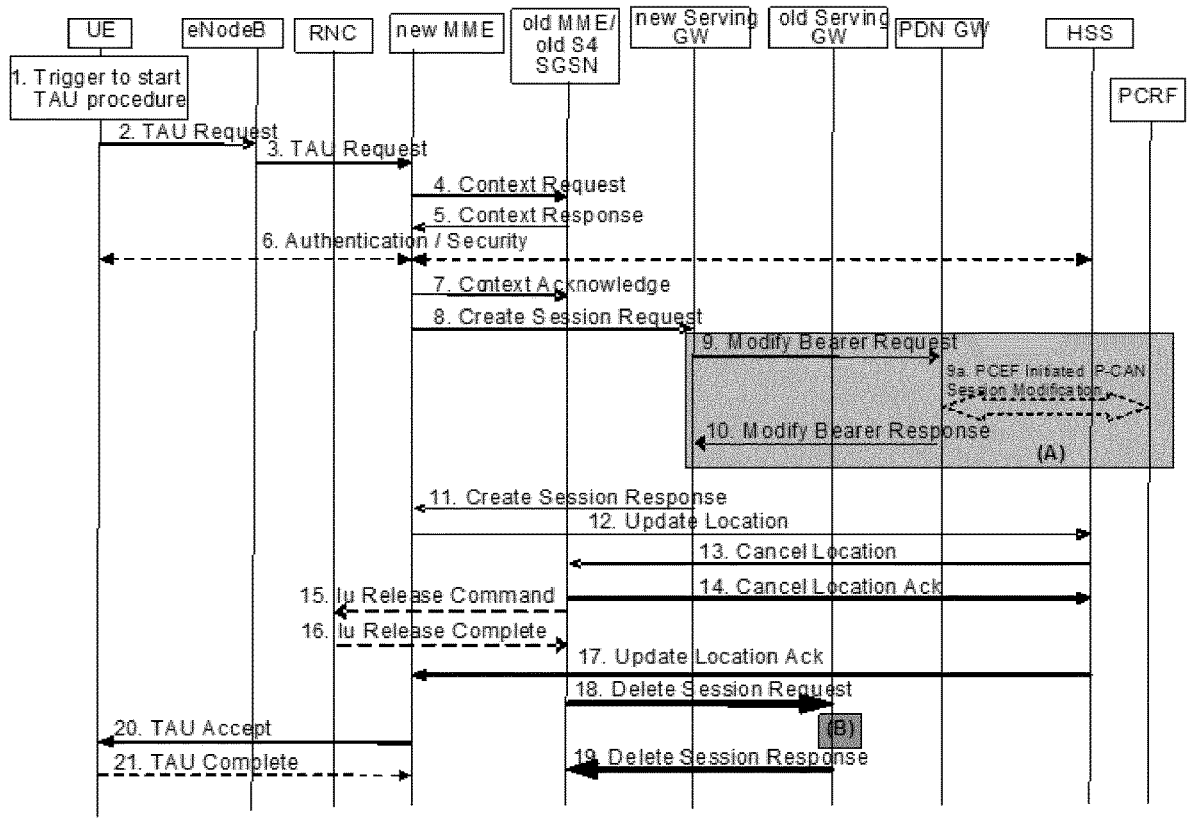
FIG. 2 is an exemplary signal/message flow diagram.

FIG. 2 illustrates an exemplary sequence diagram that illustrates an embodiment of including an indication of UE preference in the TAU request message. FIG. 2 describes a Tracking Area Update procedure with Serving GW change. The following description of FIG. 2 updates clause 5.3.3.1 of TS 23.401 in the 3GPP Rel-13 standard.

NOTE 1: For a PMIP-based S5/S8, procedure steps (A) and (B) are defined in TS 23.402 [2]. Steps 9 and 10 concern GTP based S5/S8.

NOTE 2: In case of Tracking Area Update without MME change the signalling in steps 4, 5, 7 and steps 12-17 are skipped.

(1.) One of the triggers described in clause 5.3.3.0 for starting the TAU procedure occurs.

(2.) The UE initiates the TAU procedure by sending, to the eNodeB, a TAU Request (UE Core Network Capability, MS Network Capability, Preferred Network behaviour, old GUTI, Old GUTI type, last visited TAI, active flag, EBI with pending UL user data, EPS bearer status, P TMSI Signature, additional GUTI, eKSI, NAS sequence number, NAS-MAC, KSI, Voice domain preference and UE's usage setting) message together with RRC parameters indicating the Selected Network and the old GUMMEI. An exception is that, if the TAU was triggered for load re-balancing purposes (see clause 4.3.7.3), the old GUMMEI is not included in the RRC parameters. The UE shall set the Old GUTI Type to indicate whether the Old GUTI is a native GUTI or is mapped from a P-TMSI and RAI.

If the UE's TIN indicates "GUTI" or "RAT related TMSI" and the UE holds a valid GUTI then the old GUTI indicates this valid GUTI. If the UE's TIN indicates "P TMSI" and the UE holds a valid P TMSI and related RAI then these two elements are indicated as the old GUTI. Mapping a P TMSI and RAI to a GUTI is specified in Annex H. When the UE is in connected mode (e.g. in URA_PCH) when it reselects to E UTRAN, the UE shall set its TIN to "P TMSI".

If the UE holds a valid GUTI and the old GUTI indicates a GUTI mapped from a P-TMSI and RAI, then the UE indicates the GUTI as additional GUTI. If the old GUTI indicates a GUTI mapped from a P-TMSI and RAI, and the UE has a valid P-TMSI signature, the P-TMSI signature shall be included.

The additional GUTI in the Tracking Area Update Request message allows the new MME to find any already existing UE context stored in the new MME when the old GUTI indicates a value mapped from a P-TMSI and RAI.

Alternatively, when a UE only supports E-UTRAN, it identifies itself with the old GUTI and sets the Old GUTI Type to 'native'.

The RRC parameter "old GUMMEI" takes its value from the identifier that is signalled as the old GUTI according to the rules above. For a combined MME/SGSN the eNodeB is configured to route the MME code(s) of this combined node to the same combined node. This eNodeB is also configured to route MME code(s) of GUTIs that are generated by the UE's mapping of the P TMSIs allocated by the combined node. Such an eNodeB configuration may also be used for separate nodes to avoid changing nodes in the pool caused by inter RAT mobility.

The last visited TAI shall be included in order to help the MME produce a good list of TAIs for any subsequent TAU Accept message. Selected Network indicates the network that is selected. Active flag is a request by UE to activate the radio and S1 bearers for all the active EPS Bearers by the TAU procedure when the UE is in ECM-IDLE state. EBI with pending UL user data indicates for which EPS Bearer the UE has pending UL user data. The EPS bearer status indicates each EPS bearer that is active in the UE. The TAU Request message shall be integrity protected by the NAS-MAC as described in TS 33.401 [41]. eKSI, NAS sequence number and NAS-MAC are included if the UE has valid EPS security parameters. NAS sequence number indicates the sequential number of the NAS message. KSI is included if the UE indicates a GUTI mapped from a P TMSI in the information element "old GUTI".

For UE using CIoT EPS Optimisation without any activated PDN connection, there is no active flag or EPS bearer status included in the TAU Request message.

If the UE has PDN connection of PDN Type "non-IP", UE shall indicate EPS bearer status included in the TAU Request message.

The UE sets the voice domain preference and UE's usage setting according to its configuration, as described in clause 4.3.5.9.

The UE includes extended idle mode DRX parameters information element if it needs to enable extended idle mode DRX, even if extended idle mode DRX parameters were already negotiated before.

If a UE includes a Preferred Network Behaviour, this defines the Network Behaviour the UE is expecting to be available in the network as defined in clause 4.3.5.10.

(3.) The eNodeB derives the MME address from the RRC parameters carrying the old GUMMEI, the indicated Selected Network and the RAT (NB-IoT or WB-E-UTRAN). In addition, the MME address may be derived based on RRC CIoT EPS Optimisation information. If that MME is not associated with that eNodeB or the GUMMEI is not available or the UE indicates that the TAU procedure was triggered by load re-balancing, the eNodeB selects an MME as described in clause 4.3.8.3 on "MME Selection Function".

The eNodeB forwards the TAU Request message together with the CSG access mode, CSG ID, TAI+ECGI and RAT type of the cell from where it received the message and with the Selected Network to the new MME. CSG ID is provided by RAN if the UE sends the TAU Request message via a CSG cell or a hybrid cell. CSG access mode is provided if the UE sends the TAU Request message via a hybrid cell. If the CSG access mode is not provided but the CSG ID is provided, the MME shall consider the cell as a CSG cell. For SIPTO at the Local Network with stand-alone GW architecture, the eNodeB includes the Local Home Network ID in the Initial UE Message and in Uplink NAS Transport message if the target cell is in a Local Home Network.

The RAT type shall distinguish between NB-IoT and WB-E-UTRAN types.

(4.) The new MME differentiates the type of the old node, i.e. MME or SGSN, as specified in clause 4.3.19, uses the GUTI received from the UE to derive the old MME/S4 SGSN address, and sends a Context Request (old GUTI, complete TAU Request message, P TMSI Signature, MME Address, UE validated, CIoT EPS Optimisation support indication) message to the old MME/old S4 SGSN to retrieve user information. UE Validated indicates that the new MME has validated the integrity protection of the TAU message, e.g. based on native EPS security context for the UE.

To validate the Context Request the old MME uses the complete TAU Request message and the old S4 SGSN uses the P TMSI Signature and responds with an appropriate error if integrity check fails in old MME/S4 SGSN. This shall initiate the security functions in the new MME. If the security functions authenticate the UE correctly, the new MME shall send a Context Request (IMSI, complete TAU Request message, MME Address, UE Validated) message to the old MME/S4 SGSN with the UE Validated set. If the new MME indicates that it has authenticated the UE or if the old MME/old S4 SGSN correctly validates the UE, then the old MME/old S4 SGSN starts a timer.

If the UE with emergency bearers is not authenticated in the old MME/old S4 SGSN (in a network supporting unauthenticated UEs) the old MME/old S4 SGSN continues the procedure with sending a Context Response and starting the timer also when it cannot validate the Context Request.

If the new MME supports CIoT EPS Optimisation, CIoT EPS Optimization support indication is included in the Context Request indicating support for various CIoT EPS Optimisations (e.g. support for header compression for CP optimization, etc.).

(5.) If the Context Request is sent to an old MME, the old MME responds with a Context Response (IMSI, ME Identity (IMEISV), MM Context, EPS Bearer Context(s), Serving GW signalling Address and TEID(s), ISR Supported, MS Info Change Reporting Action (if available), CSG Information Reporting Action (if available), UE Time Zone, UE Core Network Capability, UE Specific DRX Parameters) message. If the new MME supports CIoT EPS Optimisation and RoHC context exists for the UE, the Context Response also includes the Header Compression Configuration which includes the information necessary for the ROHC channel setup but not the RoHC context itself.

If the Context Request is sent to an old S4 SGSN the old S4 SGSN responds with a Context Response (MM Context, EPS Bearer Context(s), Serving GW signalling Address and TEID(s), ISR Supported, MS Info Change Reporting Action (if available), CSG Information Reporting Action (if available), UE Time Zone, UE Core Network Capability, UE Specific DRX Parameters).

The MM Context contains security related information as well as other parameters (including IMSI and ME Identity (if available)) as described in clause 5.7.2 (Information Storage for MME). The unused Authentication Quintets in the MM Context are also maintained in the SGSN. TS 33.401 [41] gives further details on the transfer of security related information.

If the MM Context received with the Context Response message did not include IMEISV and the MME does not already store the IMEISV of the UE, the MME shall retrieve the ME Identity (IMEISV) from the UE.

The PDN GW Address and TEID(s) (for GTP-based S5/S8) or GRE Keys (PMIP-based S5/S8 at the PDN GW(s) for uplink traffic) and the TI(s), is part of the EPS Bearer Context. If the UE is not known in the old MME/old S4 SGSN or if the integrity check for the TAU Request message fails, the old MME/old S4 SGSN responds with an appropriate error cause. ISR Supported is indicated if the old MME/old S4 SGSN and associated Serving GW are capable to activate ISR for the UE.

If the UE receives emergency bearer services from the old MME/old S4 SGSN and the UE is UICCless, IMSI cannot be included in the Context Response. For emergency attached UEs, if the IMSI cannot be authenticated, then the IMSI shall be marked as unauthenticated. Also, in this case, security parameters are included only if available.

If SIPTO at the Local Network is active for a PDN connection in the architecture with stand-alone GW, the old MME/old S4 SGSN shall include the Local Home Network ID of the old cell in the EPS Bearer context corresponding to the SIPTO at the Local Network PDN connection.

For a UE using CIoT EPS Optimisation without any activated PDN connection, there is no EPS Bearer Context(s) included in the Context Response message.

Based on the CIoT EPS Optimization support indication, the old MME only transfers the EPS Bearer Context(s) that the new MME supports. If the new MME does not support CIoT EPS Optimization, EPS Bearer Context(s) of non-IP PDN connection are not transferred to the new MME. If the EPS Bearer Context(s) of a PDN connection has not been transferred, the old MME shall consider all bearers of that PDN connection as failed and release that PDN connection by triggering the MME requested PDN disconnection procedure specified in clause 5.10.3. The buffered data in the old MME is discarded after receipt of Context Acknowledgement.

In this release of the specification, if the MME identifies an attempt for RAT change to or from NB-IoT (e.g. at reception of a Context Request or Context Response message or at intra-MME TAU), the MME shall not proceed further with the TAU procedure and instead explicitly detach the UE with a request to reattach (see clause 5.3.8.3).

NOTE 3: It is assumed that the TA codes for NB-IoT cells are different from the TA codes of the other E UTRA cells.

(6.) If the integrity check of the TAU Request message (sent in step 2) failed, then authentication is mandatory. The authentication functions are defined in clause 5.3.10 on "Security Function". Ciphering procedures are described in clause 5.3.10 on "Security Function". If GUTI allocation is going to be done and the network supports ciphering, the NAS messages shall be ciphered.

If this TAU request is received for a UE which is already in ECM_CONNECTED state and the PLMN-ID of the TAI sent by the eNodeB in Step 3 is different from that of the GUTI, included in the TAU Request message, the MME shall delay authenticating the UE until after Step 21 (TAU Complete message).

NOTE 4: The MME delays the authentication such that the UE first updates its registered PLMN-ID to the new PLMN-ID selected by the RAN during handover. The new PLMN-ID is provided by the MME to the UE as part of the GUTI in the TAU accept message in Step 20. Doing this ensures that the same PLMN-ID is used in the derivation of the Kasme key by both the network and the UE.

If the new MME is configured to allow emergency bearer services for unauthenticated UE the new MME behaves as follows:

- where a UE has only emergency bearer services, the MME either skips the authentication and security procedure or accepts that the authentication may fail and continues the Tracking Area Update procedure; or
- where a UE has both emergency and non emergency bearer services and authentication fails, the MME continues the Tracking Area Update procedure and deactivates all the non-emergency PDN connections as specified in clause 5.10.3.

(7.) The MME (if the MME has changed, then it is the new MME) determines to relocate the Serving GW. The Serving GW is relocated when the old Serving GW cannot continue to serve the UE. The MME (if the MME has changed, then it is the new MME) may also decide to relocate the Serving GW if a new Serving GW is expected to serve the UE longer and/or with a more optimal UE to PDN GW path, or if a new Serving GW can be co-located with the PDN GW. Selection of a new Serving GW is performed according to clause 4.3.8.2 on "Serving GW selection function".

If the MME has changed the new MME sends a Context Acknowledge (Serving GW change indication) message to the old MME/old S4 SGSN. Serving GW change indication indicates a new Serving GW has been selected. The old MME/old S4 SGSN marks in its UE context that the information in the GWs is invalid. And, if the old node is an MME, the old MME marks in its UE context that the information in the HSS is invalid.

This ensures that the old MME/old S4 SGSN updates the GWs, and the old MME updates the HSS, if the UE initiates a TAU or RAU procedure back to the old MME/old S4 SGSN before completing the ongoing TAU procedure.

NOTE 5: Updating the GWs refers to deletion of session(s) on the Serving GW followed by re-creation of session(s) on the Serving GW. The re-creation of session(s) on the Serving GW will result in successful re-establishment of the S5/S8 tunnel between the selected Serving GW and the PDN GW.

If the security functions do not authenticate the UE correctly, then the TAU shall be rejected, and the new MME shall send a reject indication to the old MME/old S4 SGSN. The old MME/old S4 SGSN shall continue as if the Identification and Context Request was never received.

ISR is not indicated in the Context Acknowledge as ISR is not activated due to the S GW change.

For UE using CIoT EPS Optimisation without any activated PDN connection, the steps 8, 9, 10, 11, 18 and 19 are skipped.

(8.) If the MME has changed, the new MME verifies the EPS bearer status received from the UE with the bearer contexts received from the old MME/old S4 SGSN. If the MME has not changed, the MME verifies EPS bearer status from the UE with the bearer contexts available in the MM context. The MME releases any network resources related to EPS bearers that are not active in the UE. If there is no bearer context at all, the MME rejects the TAU Request.

If the MME selected a new Serving GW, it sends a Create Session Request (IMSI, bearer contexts, MME Address and TEID, Type, the Protocol Type over S5/S8, RAT type, Serving Network, UE Time Zone) message per PDN connection to the selected new Serving GW. The PDN GW address and TFT (for PMIP-based S5/S8) are indicated in the bearer Contexts. Type indicates to the Serving GW to send the Modify Bearer Request to the PDN GW. The Protocol Type over S5/S8 is provided to Serving GW which protocol should be used over S5/S8 interface. RAT type indicates a change in radio access. If it is a mobility from a SGSN to a MME and if the MME supports location information change reporting, the MME shall include the User Location Information in the Create Session Request, regardless of whether ULI change reporting had been requested in the previous RAT by the PGW. If it is an inter MME mobility and if the PDN GW requested UE's location, the MME includes the User Location Information IE in this message. If the PDN GW requested User CSG information, the MME also includes the User CSG Information IE in this message.

If the new MME receives the EPS bearer context with SCEF, then the new MME updates the SCEF as defined in TS 23.682 [74].

(9.) The Serving GW informs the PDN GW(s) about the change of, for example, the RAT type that, e.g., can be used for charging, by sending the message Modify Bearer Request (Serving GW Address and TEID, RAT type, Serving Network, PDN Charging Pause Support Indication) per PDN connection to the PDN GW(s) concerned. User Location Information IE and/or UE Time Zone IE and/or User CSG Information IE are also included if they are present in step 8.

(9a) If dynamic PCC is deployed, and RAT type information needs to be conveyed from the PDN GW to the PCRF, then the PDN GW shall send RAT type information to the PCRF by means of an IP CAN Session Modification procedure as defined in TS 23.203 [6].

NOTE 6: The PDN GW does not need to wait for the PCRF response, but continues in the next step. If the PCRF response leads to an EPS bearer modification the PDN GW should initiate a bearer update procedure.

(10.) The PDN GW updates its bearer contexts and returns a Modify Bearer Response (MSISDN, Charging Id, PDN Charging Pause Enabled Indication (if PDN GW has chosen to enable the function)) message. The MSISDN is included if the PDN GW has it stored in its UE context. If there has been a RAT change towards E-UTRAN and User Location Information change reporting is required and supported in the target MME, the PGW shall provide MS Info Change Reporting Action in the Modify Bearer Response.

If the Serving GW is relocated, the PDN GW shall send one or more "end marker" packets on the old path immediately after switching the path in order to assist the reordering function in the target eNodeB. If the Serving GW has no downlink user plane established, the Serving GW shall discard the "end marker" received from the PDN GW and shall not send Downlink Data Notification. Otherwise the Serving GW shall forward the "end marker" packets to the source eNodeB or source S4 SGSN.

(11.) The Serving GW updates its bearer context. This allows the Serving GW to route bearer PDUs to the PDN GW when received from eNodeB.

The Serving GW returns a Create Session Response (Serving GW address and TEID for user plane and control plane and PDN GW TEIDs (for GTP-based S5/S8) or GRE keys (for PMIP-based S5/S8) for uplink traffic and control plane, MS Info Change Reporting Action) message to the new MME.

When the MME receives the Create Session Response message, the MME checks if there is a "Availability after DDN Failure" monitoring event or a "UE Reachability" monitoring event configured for the UE in the MME and, in such a case, sends an event notification (see TS 23.682 [74] for further information).

(12.) The new MME verifies whether it holds subscription data for the UE identified by the GUTI, the additional GUTI or by the IMSI received with the context data from the old CN node.

If there are no subscription data in the new MME for this UE, or for some network sharing scenario (e.g. GWCN) if the PLMN-ID of the TAI supplied by the eNodeB is different from that of the GUTI in the UE's context, then the new MME sends an Update Location Request (MME Identity, IMSI, ULR-Flags, MME Capabilities, Homogeneous Support of IMS Voice over PS Sessions, UE SRVCC capability, equivalent PLMN list, ME Identity (IMEISV)) message to the HSS. ULR-Flags indicate that update location is sent from an MME and the MME registration shall be updated in HSS. The HSS does not cancel any SGSN registration. The MME capabilities indicate the MME's support for regional access restrictions functionality. The inclusion of the equivalent PLMN list indicates that the MME supports the inter-PLMN handover to a CSG cell in an equivalent PLMN using the subscription information of the target PLMN. The "Homogenous Support of IMS Voice over PS Sessions" indication (see clause 4.3.5.8A) shall not be included unless the MME has completed its evaluation of the support of "IMS Voice over PS Session" as specified in clause 4.3.5.8. The ME Identity is included if step 5 caused the MME to retrieve the IMEISV from the UE.

NOTE 7: At this step, the MME may not have all the information needed to determine the setting of the IMS Voice over PS Session Supported indication for this UE (see clause 4.3.5.8). Hence the MME can send the "Homogenous Support of IMS Voice over PS Sessions" later on in this procedure.

If the UE initiates the TAU procedure in a VPLMN supporting Autonomous CSG Roaming and the HPLMN has enabled Autonomous CSG Roaming in the VPLMN (via Service Level Agreement) and the MME needs to retrieve the CSG subscription information of the UE from the CSS, the MME initiates the Update CSG Location Procedure with CSS as described in clause 5.3.12.

If the MME determines that only the UE SRVCC capability has changed, the MME sends a Notify Request to the HSS to inform about the changed UE SRVCC capability.

If all the EPS bearers of the UE have emergency ARP value, the new MME may skip the update location procedure or proceed even if the update location fails.

(13.) The HSS sends the message Cancel Location (IMSI, Cancellation Type) to the old MME with Cancellation Type set to Update Procedure.

(14.) If the timer started in step 4 is not running, the old MME removes the MM context.

Otherwise, the contexts are removed when the timer expires. It also ensures that the MM context is kept in the old MME for the case the UE initiates another TAU procedure before completing the ongoing TAU procedure to the new MME. The old MME acknowledges with the message Cancel Location Ack (IMSI).

(15.) When old S4 SGSN receives the Context Acknowledge message and if the UE is in Iu Connected, the old S4 SGSN sends an Iu Release Command message to the RNC after the timer started in step 4 has expired.

(16.) The RNC responds with an Iu Release Complete message.

(17.) The HSS acknowledges the Update Location Request message by sending an Update Location Ack (IMSI, Subscription Data) message to the new MME. The Subscription Data may contain the CSG subscription data for the registered PLMN and for the equivalent PLMN list requested by MME in step 12.

If the Update Location is rejected by the HSS, the new MME rejects the TAU Request from the UE with an appropriate cause. In such cases, the new MME releases any local MME EPS Bearer contexts for this particular UE, and additionally deletes the EPS bearer resources in the new Serving GW by sending the Delete Session Request (Cause, Operation Indication) messages to the new Serving GW. The Operation Indication flag shall not be set. Therefore, the new Serving GW receiving this request shall not initiate a delete procedure towards the PDN GW.

If the UE initiates the TAU procedure at a CSG cell, the new MME shall check whether the CSG ID and associated PLMN is contained in the CSG subscription and is not expired. If the CSG ID and associated PLMN is not present or expired, the MME shall send a Tracking Area Update reject message to the UE with an appropriate cause value.

The UE shall remove the CSG ID and associated PLMN from its Allowed CSG list if present. If the UE has ongoing emergency bearer services no CSG access control shall be performed.

If all checks are successful, then the new MME constructs a context for the UE.

(18.) If the MME has changed, when the timer started in step 4 expires, the old MME/old S4 SGSN releases any local MME or SGSN bearer resources, and additionally, the old MME/old S4 SGSN deletes the EPS bearer resources by sending the Delete Session Request (Cause, Operation Indication) messages to the old Serving GW if it received the Serving GW change indication in the Context Acknowledge message in step 7. When the Operation Indication flag is not set, that indicates to the old Serving GW that the old Serving GW shall not initiate a delete procedure towards the PDN GW. If ISR is activated, the Cause indicates to the old S GW that the old S GW shall delete the bearer resources on the other old CN node by sending Delete Bearer Request message(s) to that CN node.

If the MME has not changed, step 11 triggers the release of the EPS bearer resources at the old Serving GW.

(19.) The Serving GW acknowledges with Delete Session Response (Cause) messages.

The Serving GW discards any packets buffered for the UE.

(20.) If, due to regional subscription restrictions or access restrictions (e.g. CSG restrictions), the UE is not allowed to access the TA:

The MME rejects the Tracking Area Update Request with an appropriate cause to the UE.

For UEs with emergency EPS bearers, i.e. at least one EPS bearer has an ARP value reserved for emergency services, the new MME accepts the Tracking Area Update Request and deactivates all non-emergency PDN connections as specified in clause 5.10.3. If the Tracking Area Update procedure is initiated in ECM-IDLE state, all non-emergency EPS bearers are deactivated by the Tracking Area Update procedure without bearer deactivation signalling between the UE and the MME.

The MME sends a TAU Accept (GUTI, TAI list, EPS bearer status, NAS sequence number, NAS-MAC, IMS Voice over PS session supported, Emergency Service Support indicator, LCS Support Indication, Supported Network Behaviour, User Data accept) message to the UE. If the active flag is set, the MME may provide the eNodeB with Handover Restriction List. GUTI is included if the MME allocates a new GUTI. If the active flag is set in the TAU Request message, the user plane setup procedure can be activated in conjunction with the TAU Accept message. If the DL Data Buffer Expiration Time for the UE in the MME has not expired, the user plane setup procedure is activated even if the MME did not receive the active flag in the TAU Request message. If the new MME receives the Downlink Data Notification message or any downlink signalling message while the UE is still connected, the user plane setup procedure may be activated even if the new MME did not receive the active flag in the TAU Request message. The procedure is described in detail in TS 36.300 [5]. The message sequence should be the same as for the UE triggered Service Request procedure specified in clause 5.3.4.1 from the step when MME establishes the bearer(s). The MME indicates the EPS bearer status IE to the UE. The UE removes any internal resources related to bearers that are not marked active in the received EPS bearer status. If the EPS bearer status information was in the TAU Request, the MME shall indicate the EPS bearer status to the UE. Handover Restriction List is described in clause 4.3.5.7 "Mobility Restrictions". The MME sets the IMS Voice over PS session supported as described in clause 4.3.5.8.

For UE using CIoT EPS Optimisation without any activated PDN connection, there is no EPS bearer status included in the TAU Accept message.

The MME indicates the CIoT optimisations it supports and prefers in the Supported Network Behaviour information as defined in clause 4.3.5.10. If the UE indicated EBI in the TAU Request, the MME may indicate in the User Data Accept whether uplink user data is accepted for CP or UP.

If the MME successfully obtained Header Compression Configuration parameters in step 5 it also indicates that to the UE in the TAU Accept message.

If the MME did not receive the Voice Support Match Indicator in the MM Context, then the MME may send a UE Radio Capability Match Request to the eNB as described in clause 5.3.14. If the MME has not received the Voice Support Match Indicator from the eNB then, based on implementation, the MME may set IMS Voice over PS session supported Indication and update it at a later stage. After step 12, and in parallel to any of the preceding steps, the MME shall send a Notify Request (Homogeneous Support of IMS Voice over PS Sessions) message to the HSS:

If the MME has evaluated the support of IMS Voice over PS Sessions, see clause 4.3.5.8, and If the MME determines that it needs to update the Homogeneous Support of IMS Voice over PS Sessions, see clause 4.3.5.8A.

The Emergency Service Support indicator informs the UE that Emergency bearer services are supported. LCS Support Indication indicates whether the network supports the EPC-MO-LR and/or CS-MO-LR as described in TS 23.271 [57].

If the UE included extended idle mode DRX parameters information element, the MME includes extended idle mode DRX parameters information element if it decides to enable extended idle mode DRX.

When receiving the TAU Accept message and there is no ISR Activated indication, the UE shall set its TIN to "GUTI".

For a S GW change, ISR Activated is never indicated by the MME as it needs a RAU with the same S GW first to activate ISR. For an MME change, ISR is not activated by the new MME to avoid context transfer procedures with two old CN nodes.

If the TAU procedure is initiated by manual CSG selection and occurs via a CSG cell, the UE, upon receiving the TAU Accept message, shall add the CSG ID and associated PLMN to its Allowed CSG list if it is not already present. Manual CSG selection is not supported if the UE has emergency bearers established.

If the user plane setup is performed in conjunction with the TAU Accept message and the TAU is performed via a hybrid cell, then the MME shall send an indication whether the UE is a CSG member to the RAN along with the S1-MME control message. Based on this information, the RAN may perform differentiated treatment for CSG and non-CSG members.

NOTE 8: If the UE receives a TAU Accept message via a hybrid cell, the UE does not add the corresponding CSG ID and associated PLMN to its Allowed CSG list. Adding a CSG ID and associated PLMN to the UE's local Allowed CSG list for a hybrid cell is performed only by OTA or OMA DM procedures.

(21.) If GUTI was included in the TAU Accept, the UE acknowledges the received message by returning a TAU Complete message to the MME.

When the "Active flag" is not set in the TAU Request message and the Tracking Area Update was not initiated in ECM-CONNECTED state, the new MME releases the signalling connection with UE, according to clause 5.3.5. For a UE using CIoT EPS Optimization, when the "EBI with pending UL user data" is set, the new MME decides whether to keep the signalling connection with the UE or whether to initiate E RAB establishment i.e. to decide whether user data is to be sent using CIoT Control Plane optimization or S1-U.

NOTE 9: The new MME may initiate E RAB establishment (see TS 36.413 [36]) after execution of the security functions, or wait until completion of the TA update procedure.

For the UE, E RAB establishment may occur any time after the TA update request is sent.

In the case of a rejected tracking area update operation, due to regional subscription, roaming restrictions or access restrictions (see TS 23.221 [27] and TS 23.008 [28]), the new MME should not construct an MM context for the UE. In the case of receiving the subscriber data from HSS, the new MME may construct an MM context and store the subscriber data for the UE to optimize signalling between the MME and the HSS. A reject shall be returned to the UE with an appropriate cause and the S1 connection shall be released. Upon return to idle, the UE shall act according to TS 23.122 [10].

The new MME shall determine the Maximum APN restriction based on the received APN Restriction of each bearer context in the Context Response message and then store the new Maximum APN restriction value.

The bearer contexts shall be prioritized by the new MME. If the new MME is unable to support the same number of active bearer contexts as received from old MME/SGSN, the prioritization is used to decide which bearer contexts to maintain active and which ones to delete. In any case, the new MME shall first update all contexts in one or more P GWs and then deactivate the bearer context(s) that it cannot maintain, as described in the clause "MME Initiated Dedicated Bearer Deactivation Procedure". This shall not cause the MME to reject the tracking area update.

The new MME shall not deactivate emergency service related EPS bearers, i.e. EPS bearers with ARP value reserved for emergency services.

NOTE 10: If MS (UE) was in PMM-CONNECTED state, the bearer contexts are sent already in the Forward Relocation Request message as described in the clause "Serving RNS relocation procedures" of TS 23.060 [7].

If the tracking area update procedure fails a maximum allowable number of times, or if the MME returns a Tracking Area Update Reject (Cause) message, the UE shall enter EMM DEREGISTERED state.

Figure 3:
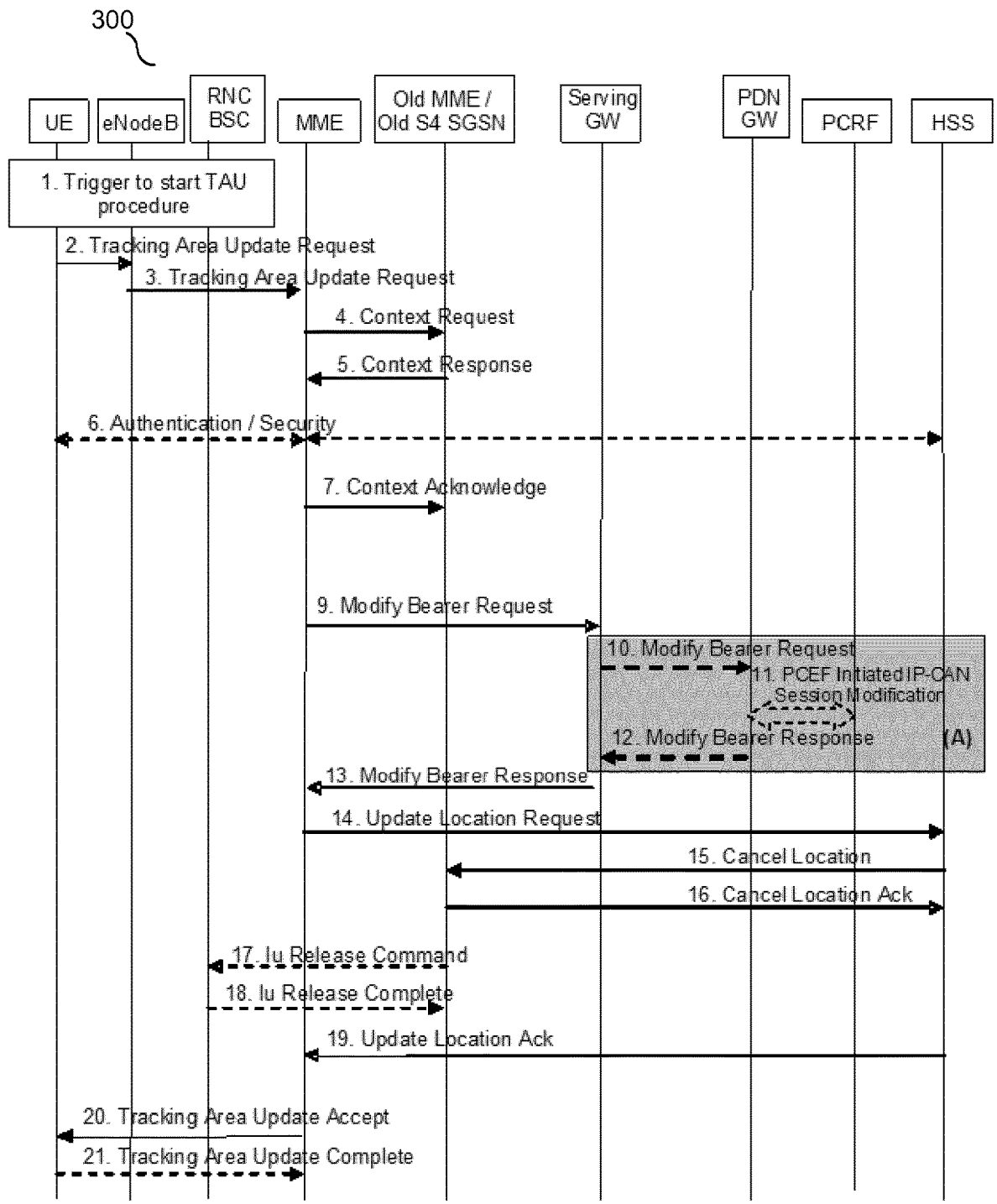
FIG. 3 is an exemplary signal/message flow diagram.

FIG. 3 illustrates an exemplary sequence diagram that illustrates an embodiment of including an indication of UE preference in the TAU request message. FIG. 3 describes a Tracking Area Update procedure without Serving GW change. The following description of FIG. 3 updates clause 5.3.3.2 of TS 23.401 in the 3GPP Rel-13 standard.

NOTE 1: For a PMIP-based S5/S8, procedure steps (A) are defined in TS 23.402 [2]. Steps 12 and 14 concern GTP based S5/S8.

NOTE 2: In case of Tracking Area Update without MME change, the signalling in steps 4, 5, 7 and steps 9-19 are skipped. A change of UE Time Zone, User CSG information or Serving Network is signalled in the next Service Request. If TAI change needs to be reported to the PGW, the location change reporting procedure described in clause 5.9.2 is performed.

NOTE 3: Deferred reporting of UE Time Zone, or Serving Network per NOTE 2 may fail when inter-MME/SGSN mobility occurs before a UE sends SERVICE REQUEST and the target MME/SGSN (e.g. pre-Release 10) does not support the "Change to Report" flag.

(1.) One of the triggers described in clause 5.3.3.0 for starting the TAU procedure occurs.

(2.) The UE initiates a TAU procedure by sending, to the eNodeB, a Tracking Area Update Request (UE Core Network Capability, MS Network Capability, Preferred Network behaviour, active flag, EBI with pending UL user data, EPS bearer status, old GUTI, Old GUTI Type, last visited TAI, P-TMSI signature, additional GUTI, KSISGSN, KSI- ASME, NAS sequence number, NAS-MAC, Voice domain preference and UE's usage setting) message together with RRC parameters indicating the Selected Network and the old GUMMEI. An exception is that, if the TAU was triggered for load re-balancing purposes (see clause 4.3.7.3), the old GUMMEI is not included in the RRC parameters. The UE shall set the Old GUTI Type to indicate whether the Old GUTI is a native GUTI or is mapped from a P-TMSI and RAI.

If the UE's TIN indicates "GUTI" or "RAT related TMSI" and the UE holds a valid GUTI then the old GUTI indicates this valid GUTI. If the UE's TIN indicates "P TMSI" and the UE holds a valid P TMSI and related RAI then these two elements are indicated as the old GUTI. Mapping a P TMSI and RAI to a GUTI is specified in Annex H. When the UE is in connected mode (e.g. in URA_PCH) when it reselects to E-UTRAN, the UE shall set its TIN to "P TMSI".

If the UE holds a valid GUTI and the old GUTI indicates a GUTI mapped from a P-TMSI and RAI, then the UE indicates the GUTI as additional GUTI. If the old GUTI indicates a GUTI mapped from a P-TMSI and RAI, and the UE has a valid P-TMSI signature, the P-TMSI signature shall be included.

The additional GUTI in the Tracking Area Update Request message allows the new MME to find any already existing UE context stored in the new MME when the old GUTI indicates a value mapped from a P-TMSI and RAI.

Alternatively, when a UE only supports E-UTRAN, it identifies itself with the old GUTI and sets the Old GUTI Type to 'native'.

The RRC parameter "old GUMMEI" takes its value from the identifier that is signalled as the old GUTI according to the rules above. For a combined MME/SGSN, the eNodeB is configured to route the MME code(s) of this combined node to the same combined node. This eNodeB is also configured to route MME code(s) of GUTIs that are generated the UE's mapping of the P TMSIs allocated by the combined node. Such an eNodeB configuration may also be used for separate nodes to avoid changing nodes in the pool caused by inter RAT mobility.

The last visited TAI shall be included in order to help the MME produce a good list of TAIs for any subsequent TAU Accept message. Selected Network indicates the network that is selected. Active flag is a request by the UE to activate the radio and S1 bearers for all the active EPS Bearers by the TAU procedure. EBI with pending UL user data indicates for which EBI the UE has pending UL user data. The UE's ISR capability is included in the UE Core Network Capability element. The EPS bearer status indicates each EPS bearer that is active in the UE. The TAU Request message shall be integrity protected by the NAS-MAC as described in TS 33.401 [41]. KSIASME is included if the UE has valid security parameters. NAS sequence number indicates the sequential number of the NAS message.

For UE using CIoT EPS Optimisation without any activated PDN connection, there is no active flag or EPS bearer status included in the TAU Request message.

If the UE has a PDN connection of PDN Type "non-IP", the UE shall indicate EPS bearer status included in the TAU Request message.

KSISGSN is included if the UE indicates a GUTI mapped from a P TMSI in the information element "old GUTI".

The UE sets the voice domain preference and UE's usage setting according to its configuration, as described in clause 4.3.5.9.

The UE includes extended idle mode DRX parameters information element if it needs to enable extended idle mode DRX, even if extended idle mode DRX parameters were already negotiated before.

If a UE includes a Preferred Network Behaviour, this defines the Network Behaviour the UE is expecting to be available in the network as defined in clause 4.3.5.10.

(3.) The eNodeB derives the MME address from the RRC parameters carrying the old GUMMEI, the indicated Selected Network and the RAT (NB-IoT or WB-E-UTRAN). In addition, the MME address may be derived based on RRC CIoT EPS Optimisation information. If that GUMMEI is not associated with the eNodeB, or the GUMMEI is not available or the UE indicates that the TAU procedure was triggered by load re-balancing, the eNodeB selects the MME as described in clause 4.3.8.3 on "MME Selection Function". The eNodeB forwards the TAU Request message together with the CSG access mode, CSG ID, TAI+ECGI and RAT type of the cell from where it received the message and with the Selected Network to the MME. CSG ID is provided by RAN if the UE sends the TAU Request message via a CSG cell or a hybrid cell. CSG access mode is provided if the UE sends the TAU Request message via a hybrid cell. If the CSG access mode is not provided but the CSG ID is provided, the MME shall consider the cell as a CSG cell. For SIPTO at the Local Network with stand-alone GW architecture, the eNodeB includes the Local Home Network ID in the Initial UE Message and in Uplink NAS Transport message if the target cell is in a Local Home Network.

The RAT type shall distinguish between NB-IoT and WB-E-UTRAN types.

(4.) The new MME differentiates the type of the old node, i.e. MME or SGSN, as specified in clause 4.3.19, uses the GUTI received from the UE to derive the old MME/S4 SGSN address and sends a Context Request (old GUTI, MME Address, UE Validated, complete TAU Request message, P TMSI Signature, CIoT EPS Optimisation support indication) message to the old MME/S4 SGSN to retrieve the user information. UE Validated indicates that the new MME has validated the integrity protection of the TAU message, e.g. based on native EPS security context for the UE. To validate the Context Request the old MME uses the complete TAU Request message and the old S4 SGSN uses the P-TMSI Signature and responds with an appropriate error if integrity check fails in old MME/S4 SGSN. This shall initiate the security functions in the new MME. If the security functions authenticate the UE correctly, the new MME shall send a Context Request (IMSI, complete TAU Request message, MME Address, UE Validated) message to the old MME/S4 SGSN with the UE Validated set. If the new MME indicates that it has authenticated the UE or if the old MME/old S4 SGSN authenticates the UE, the old MME/old S4 SGSN starts a timer.

If the UE with emergency bearers is not authenticated in the old MME/old S4 SGSN (in a network supporting unauthenticated UEs), the old MME/old S4 SGSN continues the procedure with sending a Context Response and starting the timer also when it cannot validate the Context Request.

If the new MME supports CIoT EPS Optimisation, a CIoT EPS Optimization support indication is included in the Context Request indicating support for various CIoT EPS Optimisations (e.g. support for header compression for CP optimization, etc.).

(5.) If the Context Request is sent to an old MME the old MME responds with a Context Response (IMSI, ME Identity (IMEISV), unused EPS Authentication Vectors, KSI- ASME, KASME, EPS Bearer Context(s), Serving GW signalling Address and TEID(s), MS Info Change Reporting Action (if available), CSG Information Reporting Action (if available), UE Time Zone, UE Core Network Capability, UE Specific DRX Parameters, Change to Report (if present)) message. If the new MME supports CIoT EPS Optimisation and RoHC context exists for the UE, the Context Response also includes the Header Compression Configuration which includes the information necessary for the ROHC channel setup but not the RoHC context itself.

If the Context Request is sent to an old S4 SGSN the old S4 SGSN responds with a Context Response (IMSI, ME Identity (if available), unused Authentication Quintets, CK, IK, KSISGSN, EPS Bearer Context(s), Serving GW signalling Address and TEID(s), ISR Supported, MS Info Change Reporting Action (if available), CSG Information Reporting Action (if available), UE Time Zone, UE Core Network Capability, UE Specific DRX Parameters, Change to Report (if present)) message. The Authentication Quintets are maintained by the old S4 SGSN. TS 33.401 [41] gives further details on the transfer of security related information.

Change to Report flag is included by the old MME or the old S4 SGSN if reporting of change of UE Time Zone, or Serving Network, or both towards Serving GW/PDN GW was deferred by the old MME or old S4 SGSN.

If the Context Response message did not include IMEISV and the MME does not already store the IMEISV of the UE, the MME shall retrieve the ME Identity (IMEISV) from the UE.

The PDN GW Address and TEID(s) (for GTP-based S5/S8) or GRE Keys (PMIP-based S5/S8 at the PDN GW(s) for uplink traffic and the TI(s), is part of the EPS Bearer Context. ISR Supported is indicated if the old SGSN and associated Serving GW are capable to activate ISR for the UE.

The new MME shall ignore the UE Core Network Capability contained in the Context Response only when it has previously received an UE Core Network Capability in the Tracking Area Update Request. If the UE is not known in the old MME/old S4 SGSN or if the integrity check for the TAU request message fails, the old MME/old S4 SGSN responds with an appropriate error cause.

If the DL Data Buffer Expiration Time for the UE has not expired (see High latency communication in clause 4.3.17.7), the old MME/old S4-SGSN indicates Buffered DL Data Waiting in the Context Response. When this is indicated, the new MME shall setup the user plane in conjunction to the TAU procedure for delivery of the buffered DL data.

If the UE receives emergency bearer services from the old MME/old S4 SGSN and the UE is UICCless, IMSI cannot be included in the Context Response. For emergency attached UEs, if the IMSI cannot be authenticated, then the IMSI shall be marked as unauthenticated. Also, in this case, security parameters are included only if available.

If SIPTO at the Local Network is active for a PDN connection in the architecture with stand-alone GW, the old MME/old S4 SGSN shall include the Local Home Network ID of the old cell in the EPS Bearer context corresponding to the SIPTO at the Local Network PDN connection.

For UE using CIoT EPS Optimisation without any activated PDN connection, there is no EPS Bearer Context(s) included in the Context Response message.

Based on the CIoT EPS Optimization support indication, old MME only transfers the EPS Bearer Context(s) that the new MME supports. If the new MME does not support CIoT EPS Optimization, EPS Bearer Context(s) of non-IP PDN connection are not transferred to the new MME. If the EPS Bearer Context(s) of a PDN connection has not been transferred, the old MME shall consider all bearers of that PDN connection as failed and release that PDN connection by triggering the MME requested PDN disconnection procedure specified in clause 5.10.3. The buffered data in the old MME is discarded after receipt of Context Acknowledgement.

In this release of the specification, if the MME identifies an attempt for RAT change to or from NB-IOT (e.g. at reception of a Context Request or Context Response message or at intra-MME TAU), the MME shall not proceed further with the TAU procedure and instead explicitly detach the UE with a request to reattach (see clause 5.3.8.3).

NOTE 4: It is assumed that the TA codes for NB-IoT cells are different from the TA codes of the other E UTRA cells.

(6.) If the integrity check of TAU Request message (sent in step 2) failed, then authentication is mandatory. The authentication functions are defined in clause 5.3.10 on "Security Function". Ciphering procedures are described in clause 5.3.10 on "Security Function". If GUTI allocation is going to be done and the network supports ciphering, the NAS messages shall be ciphered.

If this TAU request is received for a UE which is already in ECM_CONNECTED state and the PLMN-ID of the TAI sent by the eNodeB in Step 3 is different from that of the GUTI included in the TAU Request message, the MME shall delay authenticating the UE until after Step 21 (TAU Complete message).

NOTE 5: The MME delays the authentication such that the UE first updates its registered PLMN-ID to the new PLMN-ID selected by the RAN during handover. The new PLMN-ID is provided by the MME to the UE as part of the GUTI in the TAU accept message in Step 20. Doing this ensures that the same PLMN-ID is used in the derivation of the Kasme key by both the network and the UE.

If the new MME is configured to allow emergency bearer services for unauthenticated UE, the new MME behaves as follows:
  where a UE has only emergency bearer services, the MME either skips the authentication and security procedure or accepts that the authentication may fail and continues the Tracking Area Update procedure; or
  where a UE has both emergency and non-emergency bearer services and authentication fails, the MME continues the Tracking Area Update procedure and deactivates all the non-emergency PDN connections as specified in clause 5.10.3.

(7.) If the old node is an old MME, the new MME sends a Context Acknowledge message to the old MME. The old MME marks in its context that the information in the GW and the HSS are invalid. This ensures that the MME updates the GWs and the HSS if the UE initiates a TAU procedure back to the MME before completing the ongoing TAU procedure.

NOTE 6: Updating the GWs refers to modification of session(s) on the Serving GW. This will result in successful re-establishment of the S11/S4 tunnel between the MME/SGSN and the Serving GW.

If the old node is an old S4 SGSN the MME sends a Context Acknowledge (ISR Activated) message to the old SGSN. Unless ISR Activated is indicated by the MME, the old S4 SGSN marks in its context that the information in the GWs is invalid. This ensures that the old S4 SGSN updates the GWs if the UE initiates a RAU procedure back to the old S4 SGSN before completing the ongoing TAU procedure. If ISR Activated is indicated to the old S4 SGSN, this indicates that the old S4 SGSN shall maintain its UE context including authentication quintets and stop the timer started in step 4. In this case, if the Implicit Detach timer is running, the old S4 SGSN shall re-start it with a slightly larger value than the UE's GERAN/UTRAN Deactivate ISR timer. Also, in this case, if the old SGSN has maintained the Serving GW address for user plane and S4 GTP-U TEID, the old SGSN shall remove Serving GW address for user plane and S4 GTP-U TEID locally. When ISR Activated is not indicated and this timer expires the old SGSN deletes all bearer resources of that UE. As the Context Acknowledge from the MME does not include any S GW change the S4 SGSN does not send any Delete Session Request message to the S GW. The MME shall not activate ISR if the associated Serving GW does not support ISR.

If the security functions do not authenticate the UE correctly, then the TAU shall be rejected, and the MME shall send a reject indication to the old MME/old S4 SGSN. The old MME/old S4 SGSN shall continue as if the Identification and Context Request was never received.

For UE using CIoT EPS Optimisation without any activated PDN connection, the steps 9, 10, 11, 12 and 13 are skipped.

(8.) Void.

(9.) If the MME has changed, the new MME adopts the bearer contexts received from the old MME/SGSN as the UE's EPS bearer contexts to be maintained by the new MME. The MME establishes the EPS bearer(s) in the indicated order. The MME deactivates the EPS bearers which cannot be established.

The MME verifies the EPS bearer status received from the UE with the EPS bearer contexts it maintains and releases any network resources related to EPS bearers that are not active in the UE. If there is no bearer context at all, the MME rejects the TAU Request. If the MME has changed, the new MME sends a Modify Bearer Request (new MME address and TEID, ISR Activated, RAT type) message per PDN connection to the Serving GW. If there is no need for the SGW to send the signalling to the PDN GW, the MME may send Modify Access Bearers Request (new MME address and TEID) per UE to the Serving GW to optimize the signalling. The PDN GW address is indicated in the bearer contexts. If indicated, the information ISR Activated indicates that ISR is activated. If it is a mobility from a SGSN to a MME and if the MME supports location information change reporting, the MME shall include the User Location Information in the Modify Bearer Request, regardless of whether ULI change reporting had been requested in the previous RAT by the PGW. If it is an inter MME mobility and if the PDN GW requested UE's location, the MME includes the User Location Information IE in this message. If the PDN GW requested User CSG information, the MME also includes the User CSG Information IE in this message. If either the UE Time Zone has changed or Context Response message indicated pending UE Time Zone change reporting (via Change to Report flag), the MME includes the UE Time Zone IE in this message. If either the Serving Network has changed or Context Response message indicated pending Serving Network change reporting (via Change to Report flag) the MME includes the new Serving Network IE in this message. In network sharing scenarios Serving Network denotes the serving core network. If the old node is an old MME at a Tracking Area Update with a MME change ISR Activated shall not be indicated.

NOTE 7: The User CSG Information IE is only sent in step 9 if the "Active flag" is set in the TAU Request message.

When the Modify Access Bearers Request or Modify Bearer Request does not indicate ISR Activated, the S GW deletes any ISR resources by sending a Delete Bearer Request to the other CN node that has bearer resources on the S GW reserved.

If the new MME receives the EPS bearer context with SCEF, then the new MME updates the SCEF as defined in TS 23.682 [74].

For Control Plane CIoT EPS optimisation, if the DL data is buffered in the Serving GW, and if this is a Tracking Area Update without MME change and the DL Data Buffer Expiration Time in the MM context for the UE in the MME has not expired, or if this is a Tracking Area Update with MME change and the old MME/old S4-SGSN indicated Buffered DL Data Waiting in the Context Response in step 5, the MME includes MME address and MME DL TEID in the Modify Bearer Request.

(10.) If the RAT type has changed, or the Serving GW has received the User Location Information IE or the UE Time Zone IE or User CSG Information IE and/or the Serving Network IE from the MME in step 9, the Serving GW informs the PDN GW(s) about this information that, e.g., can be used for charging, by sending the message Modify Bearer Request (RAT type) per PDN connection to the PDN GW(s) concerned. User Location Information IE and/or UE Time Zone IE and/or User CSG Information IE and/or Serving Network IE are also included if they are present in step 9.

If the Modify Bearer Request message is not sent because of above reasons and the PDN GW charging is paused, then the SGW shall send Modify Bearer Request message with PDN Charging Pause Stop Indication to inform the PDN GW that the charging is no longer paused. Other IEs are not included in this message.

(11.) If dynamic PCC is deployed, and RAT type information or UE location information needs to be conveyed from the PDN GW to the PCRF, then the PDN GW shall send this information to the PCRF by means of an IP CAN Session Modification procedure as defined in TS 23.203 [6].

NOTE 8: The PDN GW does not need to wait for the PCRF response, but continues in the next step. If the PCRF response leads to an EPS bearer modification, the PDN GW should initiate a bearer update procedure.

(12.) The PDN GW updates its context field to allow DL PDUs to be routed to the correct Serving GW. PDN GW returns a Modify Bearer Response (MSISDN) to the Serving GW. The MSISDN is included if the PDN GW has it stored in its UE context. If there has been a RAT change towards E-UTRAN and User Location Information change reporting is required and supported in the target MME, the PGW shall provide MS Info Change Reporting Action in the Modify Bearer Response.

(13.) The Serving GW updates its bearer context. If ISR Activated is indicated in step 9 and RAT Type received in step 9 indicates E UTRAN, then the Serving GW only updates the MME Control Plane Address stored locally and keeps the SGSN related information unchanged. Also, in this case, if the Serving GW has maintained the SGSN address for user plane and S4 GTP-U TEID, the Serving GW removes the SGSN address for user plane and S4 GTP-U TEID locally. Otherwise the Serving GW shall update all of the information stored locally for this UE with the related information received from the MME. This allows the Serving GW to route Bearer PDUs to the PDN GW when received from eNodeB. The Serving GW shall return a Modify Bearer Response (Serving GW address and TEID for uplink traffic, MS Info Change Reporting Action) message to the new MME as a response to a Modify Bearer Request message, or a Modify Access Bearers Response (Serving GW address and TEID for uplink traffic) as a response to a Modify Access Bearers Request message. If the Serving GW cannot serve the MME Request in the Modify Access Bearers Request message without S5/S8 signalling other than to unpause charging in the PDN GW or without corresponding Gxc signalling when PMIP is used over the S5/S8 interface, it shall respond to the MME with indicating that the modifications are not limited to S1-U bearers, and the MME shall repeat its request using Modify Bearer Request message per PDN connection.

When the MME receives the Modify Bearer Response or the Modify Access Bearers Response message, the MME checks if there is a "Availability after DDN Failure" monitoring event or a "UE Reachability" monitoring event configured for the UE in the MME and, in such a case, sends an event notification (see TS 23.682 [74] for further information).

For Control Plane CIoT EPS optimisation, if the MME address and MME DL TEID are provided in step 9, the Serving GW includes Serving GW address and Serving GW UL TEID in the Modify Bearer Response message. The DL data is sent to the MME from the Serving GW.

The buffered DL data is sent to the UE as described in steps 12-14 of clause 5.3.4B.3.

(14.) The new MME verifies whether it holds subscription data for the UE identified by the GUTI, the additional GUTI or by the IMSI received with the context data from the old CN node.

If there are no subscription data in the new MME for this UE, or for some network sharing scenario (e.g. GWCN), if the PLMN-ID of the TAI supplied by the eNodeB is different from that of the GUTI in the UE's context, then the new MME informs the HSS of the change of MME by sending an Update Location Request (MME Id, IMSI, ULR-Flags, MME Capabilities, Homogenous Support of IMS Voice over PS Sessions, UE SRVCC capability, equivalent PLMN list, ME Identity (IMEISV)) message to the HSS. ULR-Flags indicates that update location is sent from an MME and the MME registration shall be updated in HSS. The HSS does not cancel any SGSN registration. The MME capabilities indicate the MME's support for regional access restrictions functionality. The inclusion of the equivalent PLMN list indicates that the MME supports the inter-PLMN handover to a CSG cell in an equivalent PLMN using the subscription information of the target PLMN. The "Homogenous Support of IMS Voice over PS Sessions" indication (see clause 4.3.5.8A) shall not be included unless the MME has completed its evaluation of the support of "IMS Voice over PS Session" as specified in clause 4.3.5.8. The ME Identity is included if step 5 caused the MME to retrieve the IMEISV from the UE.

NOTE 9: At this step, the MME may not have all the information needed to determine the setting of the IMS voice over PS Session Supported indication for this UE (see clause 4.3.5.8). Hence the MME can send the "Homogenous Support of IMS Voice over PS Sessions" later on in this procedure.

If the UE initiates the TAU procedure in a VPLMN supporting Autonomous CSG Roaming and the HPLMN has enabled Autonomous CSG Roaming in the VPLMN (via Service Level Agreement) and the MME needs to retrieve the CSG subscription information of the UE from the CSS, the MME initiates the Update CSG Location Procedure with CSS as described in clause 5.3.12.

If the MME determines that only the UE SRVCC capability has changed, the MME sends a Notify Request to the HSS to inform about the changed UE SRVCC capability.

If all the EPS bearers of the UE have emergency ARP value, the new MME may skip the update location procedure or proceed even if the update location fails.

(15.) The HSS sends a Cancel Location (IMSI, Cancellation type) message to the old MME with a Cancellation Type set to Update Procedure.

(16.) When receiving a Cancel Location message and the timer started in step 4 is not running, the old MME removes the MM and bearer contexts. Otherwise, the contexts are removed when the timer expires. It also ensures that the MM context is kept in the old MME for the case the UE initiates another TAU procedure before completing the ongoing TAU procedure to the new MME. The old MME acknowledges with a Cancel Location Ack (IMSI) message.

NOTE 10: ISR Activated is never indicated from new to old MME.

So an old MME deletes all the bearer resources of the UE in any case when the timer started in step 4 expires, which is independent on receiving a Cancel Location message.

(17.) When receiving the Context Acknowledge message and if the UE is Iu Connected, the old SGSN sends an Iu Release Command message to the RNC after the timer started in step 4 has expired.

(18.) The RNC responds with an Iu Release Complete message.

(19.) The HSS acknowledges the Update Location Request by returning an Update Location Ack (IMSI, Subscription Data) message to the new MME after the cancelling of the old MME context is finished. If all checks are successful, the MME constructs an MM context for the UE. The Subscription Data may contain the CSG subscription data for the registered PLMN and for the equivalent PLMN list requested by MME in step 14.

If the UE initiates the TAU procedure at a CSG cell, the new MME shall check whether the CSG ID and associated PLMN is contained in the CSG subscription and is not expired. If the CSG ID and associated PLMN is not present or expired, the MME shall send a Tracking Area Update reject message to the UE with an appropriate cause value. The UE shall remove the CSG ID and associated PLMN from its Allowed CSG list if present.

If the Update Location is rejected by the HSS, the new MME rejects the TAU Request from the UE with an appropriate cause sent in the TAU Reject message to the UE. In such cases, the new MME releases any local MME EPS Bearer contexts for this particular UE.

(20.) If due to regional subscription restrictions or access restrictions (e.g. CSG restrictions) the UE is not allowed to access the TA:

The MME rejects the Tracking Area Update Request with an appropriate cause to the UE.

For UEs with emergency EPS bearers, i.e. at least one EPS bearer has an ARP value reserved for emergency services, the new MME accepts the Tracking Area Update Request and deactivates all non-emergency PDN connections as specified in clause 5.10.3. If the Tracking Area Update procedure is initiated in ECM-IDLE state, all non-emergency EPS bearers are deactivated by the Tracking Area Update procedure without bearer deactivation signalling between the UE and the MME.

The MME responds to the UE with a Tracking Area Update Accept (GUTI, TAI-list, EPS bearer status, NAS sequence number, NAS-MAC, ISR Activated, IMS Voice over PS session supported, Emergency Service Support indicator, LCS Support Indication, Supported Network Behaviour, User Data accept) message. If the active flag is set the Handover Restriction List may be sent to eNodeB as eNodeB handles the roaming restrictions and access restrictions in the Intra E-UTRAN case. If the active flag is set in the TAU Request message, the user plane setup procedure is activated in conjunction with the TAU Accept message. If this is a Tracking Area Update without MME change and the DL Data Buffer Expiration Time in the MM context for the UE in the MME has not expired, or if this is a Tracking Area Update with MME change and the old MME/old S4-SGSN indicated Buffered DL Data Waiting in the Context Response in step 5, the user plane setup procedure is activated even if the MME did not receive the active flag in the TAU Request message. If the new MME receives the Downlink Data Notification message or any downlink signalling message while the UE is still connected, the user plane setup procedure may be activated even if the new MME did not receive the active flag in the TAU Request message. The procedure is described in detail in TS 36.300 [5]. The message sequence should be the same as for the UE triggered Service Request procedure specified in clause 5.3.4.1 from the step when MME establish the bearers(s). The EPS bearer status indicates the active bearers in the network. The UE removes any internal resources related to bearers not marked active in the received EPS bearer status. If the EPS bearer status information was in the TAU Request, the MME shall indicate the EPS bearer status to the UE. If ISR Activated is indicated to the UE, this indicates that its P-TMSI and RAI shall remain registered with the network and shall remain valid in the UE. At a Tracking Area Update with an MME change, ISR Activated shall not be indicated. At a Tracking Area Update without an MME change, if ISR is activated for the UE when the MME receives the Tracking Area Update Request, the MME should maintain ISR by indicating ISR Activated in the Tracking Area Update Accept message. Handover Restriction List is described in clause 4.3.5.7 "Mobility Restrictions". The MME sets the IMS Voice over PS session supported as described in clause 4.3.5.8.

For a UE using CIoT EPS Optimisation without any activated PDN connection, there is no EPS bearer status included in the TAU Accept message.

The MME indicates the CIoT optimisations it supports and prefers in the Supported Network Behaviour information as defined in clause 4.3.5.10. If the UE indicated EBI in the TAU Request, the MME may indicate in the User Data Accept whether uplink user data is accepted for CP or UP.

If the MME successfully obtained Header Compression Configuration parameters in step 5, it also indicates to that to the UE in TAU Accept message.

The MME checks if there is a "Availability after DDN Failure" monitoring event or a "UE Reachability" monitoring event configured for the UE in the MME for which an event notification has not yet been sent. In such a case an event notification is sent (see TS 23.682 [74] for further information).

If the MME did not receive the Voice support match indicator in the MM Context, then the MME may send a UE Radio Capability Match Request to the eNB as described in clause 5.3.14. If the MME has not received a Voice support match indicator from the eNB, then based on implementation, the MME may set IMS Voice over PS session supported Indication and update it at a later stage. After step 14, and in parallel to any of the preceding steps, the MME shall send a Notify Request (Homogeneous Support of IMS Voice over PS Sessions) message to the HSS:

If the MME has evaluated the support of IMS Voice over PS Sessions, see clause 4.3.5.8, and If the MME determines that it needs to update the Homogeneous Support of IMS Voice over PS Sessions, see clause 4.3.5.8A.

The Emergency Service Support indicator informs the UE that Emergency bearer services are supported. LCS Support Indication indicates whether the network supports the EPC-MO-LR and/or CS-MO-LR as described in TS 23.271 [57].

When receiving the TAU Accept message and there is no ISR Activated indication the UE shall set its TIN to "GUTI". When ISR Activated is indicated and the UE's TIN indicates "GUTI" the UE's TIN shall not be changed. When ISR Activated is indicated and the TIN is "P TMSI" or "RAT related TMSI" the UE shall set its TIN to "RAT related TMSI".

For an MME change, ISR is not activated by the new MME to avoid context transfer procedures with two old CN nodes.

For an emergency attached UE, emergency ISR is not activated.

If the TAU procedure is initiated by manual CSG selection and occurs via a CSG cell, the UE, upon receiving TAU Accept message, shall add the CSG ID and associated PLMN to its Allowed CSG list if it is not already present. Manual CSG selection is not supported if the UE has emergency bearers established.

If the UE included extended idle mode DRX parameters information element, the MME includes extended idle mode DRX parameters information element in the TAU accept if it decides to enable extended idle mode DRX.

If the user plane setup is performed in conjunction with the TAU Accept message and the TAU is performed via a hybrid cell, then the MME shall send an indication whether the UE is a CSG member to the RAN along with the S1-MME control message. Based on this information, the RAN may perform differentiated treatment for CSG and non-CSG members.

NOTE 11: If the UE receives a TAU Accept message via a hybrid cell, the UE does not add the corresponding CSG ID and associated PLMN to its Allowed CSG list. Adding a CSG ID and associated PLMN to the UE's local Allowed CSG list for a hybrid cell is performed only by OTA or OMA DM procedures.

(21.) If the GUTI was changed the UE acknowledges the new GUTI by returning a Tracking Area Update Complete message to the MME.

When the "Active flag" is not set in the TAU Request message and the Tracking Area Update was not initiated in ECM-CONNECTED state, the MME releases the signalling connection with UE, according to clause 5.3.5. For a UE using CIoT EPS Optimization, when the "EBI with pending UL user data" is set, the new MME decides whether to keep the signalling connection with the UE or whether to initiate E RAB establishment i.e. to decide whether user data is to be sent using CIoT Control Plane optimization or S1-U.

NOTE 12: The new MME may initiate E RAB establishment (see TS 36.413 [36]) after execution of the security functions, or wait until completion of the TA update procedure. For the UE, E RAB establishment may occur any time after the TA update request is sent.

In the case of a rejected tracking area update operation, due to regional subscription, roaming restrictions, or access restrictions (see TS 23.221 [27] and TS 23.008 [28]), the new MME should not construct an MM context for the UE.

In the case of receiving the subscriber data from HSS, the new MME may construct an MM context and store the subscriber data for the UE to optimize signalling between the MME and the HSS. A reject shall be returned to the UE with an appropriate cause and the S1 connection shall be released. Upon return to idle, the UE shall act according to TS 23.122 [10].

If the new MME is unable to update the bearer context in one or more P GWs, the new MME shall deactivate the corresponding bearer contexts as described in clause "MME Initiated Dedicated Bearer Deactivation Procedure". This shall not cause the MME to reject the tracking area update.

The new MME shall determine the Maximum APN restriction based on the received APN Restriction of each bearer context in the Context Response message and then store the new Maximum APN restriction value.

The bearer contexts shall be prioritized by the new MME. If the new MME is unable to support the same number of active bearer contexts as received from old MME/SGSN, the prioritisation is used to decide which bearer contexts to maintain active and which ones to delete. In any case, the new MME shall first update all contexts in one or more P GWs and then deactivate the context(s) that it cannot maintain as described in clause "MME Initiated Dedicated Bearer Deactivation Procedure". This shall not cause the MME to reject the tracking area update.

The new MME shall not deactivate emergency service related EPS bearers, i.e. EPS bearers with ARP value reserved for emergency services.

NOTE 13: If MS (UE) was in PMM-CONNECTED state the bearer contexts are sent already in the Forward Relocation Request message as described in clause "Serving RNS relocation procedures" of TS 23.060 [7].

If the tracking area update procedure fails a maximum allowable number of times, or if the MME returns a Tracking Area Update Reject (Cause) message, the UE shall enter EMM DEREGISTERED state.

Figure 4:
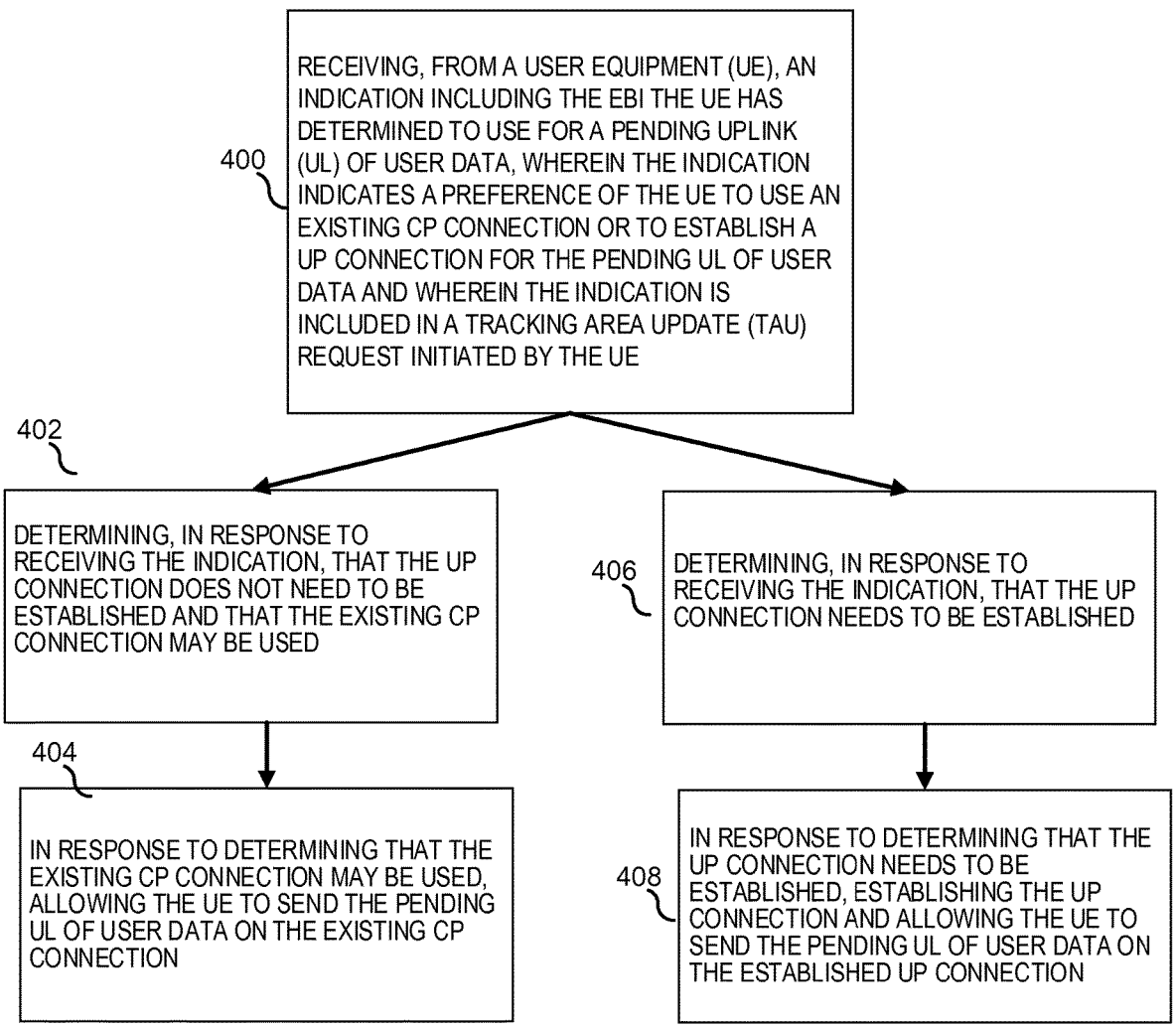
FIG. 4 is an exemplary flow chart illustrating a process according to some embodiments.

FIG. 4 illustrates an embodiment of a process performed in a communications network. In some embodiments, the process may be performed by an MME. The process may start at step 400, receiving, from a user equipment (UE), an indication including the EBI the UE has determined to use for a pending uplink (UL) of user data. The indication indicates a preference of the UE to use an existing CP connection or to establish a UP connection for the pending UL of user data. The indication is included in a Tracking Area Update (TAU) request initiated by the UE. The process further includes step 402, determining, in response to receiving the indication, that the UP connection does not need to be established and that the existing CP connection may be used. The process further includes step 403, in response to determining that the existing CP connection may be used. The process further includes step 404, in response to determining that the existing CP connection may be used, allowing the UE to send the pending UL of user data on the existing CP connection.

Alternatively, instead of steps 402 and 404, or in addition to those steps, the process may further include steps 406 and 408. That is, the process may further include step 406, determining, in response to receiving the indication, that a UP connection needs to be established. The process may also further include step 408, in response to determining that the UP connection needs to be established, establishing the UP connection and allowing the UE to send the pending UL of user data on the established UP connection.

In some embodiments, the determining step is based in part on the indication including the EBI the UE has determined to use for a pending UL of user data. In some embodiments, the determining step is based in part on a history of prior user data uplinks from the UE. For example, if the UE has a history of sending short data uplinks relatively infrequently, the network may decide to use the existing CP connection. On the other hand, if the UE has a history of sending rapid bursts of information, the network may determine that it would be more efficient to set up a UP connection for the pending UL of user data, under the expectation that the UE will have additional user data to send. In some embodiments, allowing the UE to send the pending UL of user data on the existing CP connection comprises sending an indication to the UE that the existing CP connection may be used. In some embodiments, allowing the UE to send the pending UL of user data on the established UP connection comprises sending an indication to the UE that the established UP connection may be used. In some embodiments, the indication to the UE is included in a TAU Accept message. This may include an explicit indication to the UE, or may take the form of an implicit indication such as by returning UL connection information to the UE.

Figure 5:
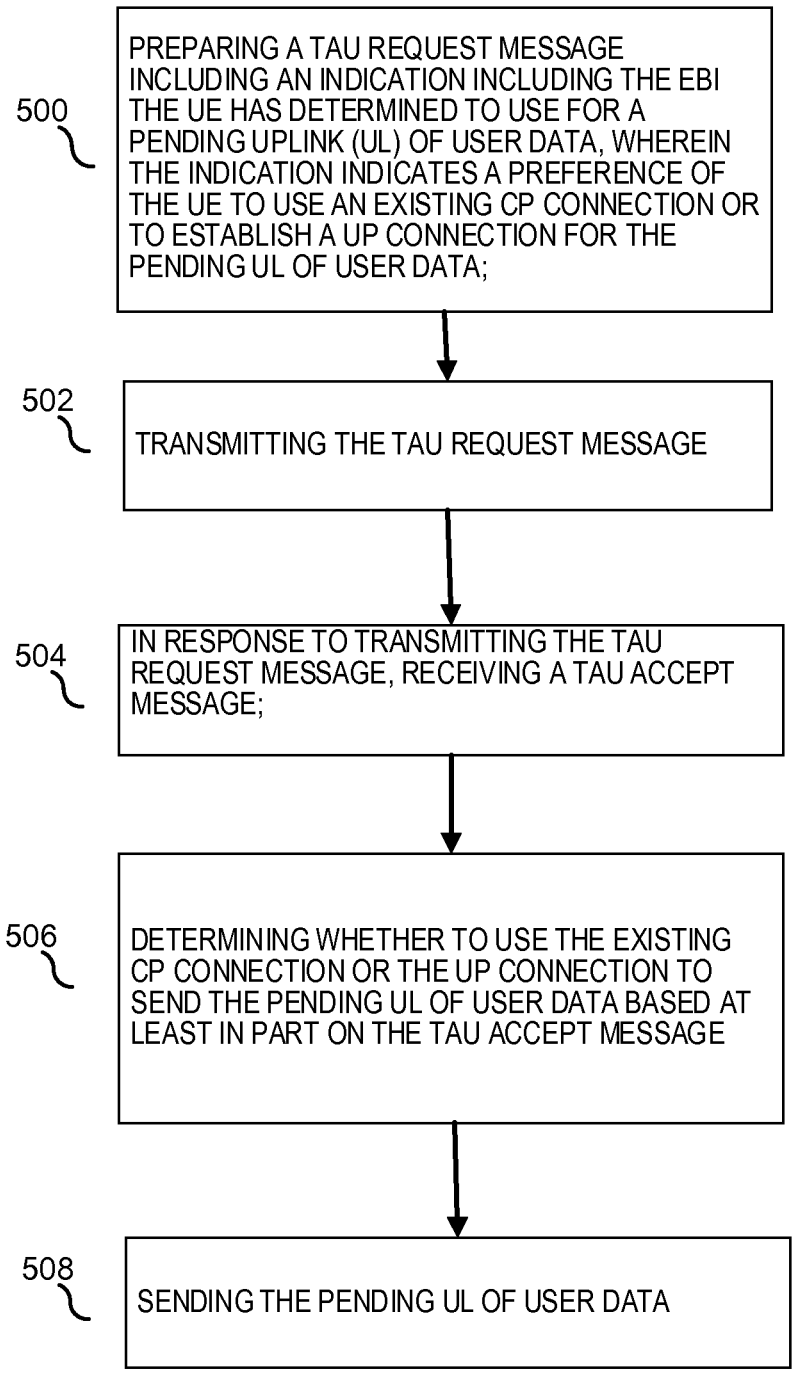
FIG. 5 is an exemplary flow chart illustrating a process according to some embodiments.

FIG. 5 illustrates an embodiment of a process performed in a user equipment (UE). The process may start at step 500, preparing a TAU Request message including an indication including the EBI the UE has determined to use for a pending uplink (UL) of user data. The indication indicates a preference of the UE to use an existing CP connection or to establish a UP connection for the pending UL of user data. The process further includes step 502, transmitting the TAU Request message, and step 504, in response to transmitting the TAU Request message, receiving a TAU Accept message. The process further includes step 506, determining whether to use the existing CP connection or the UP connection to send the pending UL of user data based at least in part on the TAU Accept message. The process further includes step 508, sending the pending UL of user data.

In some embodiments, the TAU Accept message includes an indication as to whether the existing CP connection or the UP connection is to be used and the determining whether to use the existing CP connection or the UP connection to send the pending UL of user data based at least in part on the TAU Accept message is further based on the indication as to whether the existing CP connection or the UP connection is to be used. In some embodiments, determining whether to use the existing CP connection or the UP connection to send the pending UL of user data based at least in part on the TAU Accept message includes determining to use the UP connection based on the UP connection being set up. In some embodiments, determining whether to use the existing CP connection or the UP connection to send the pending UL of user data based at least in part on the TAU Accept message includes determining to use the CP connection based on the UP connection not being set up.

Figure 6:
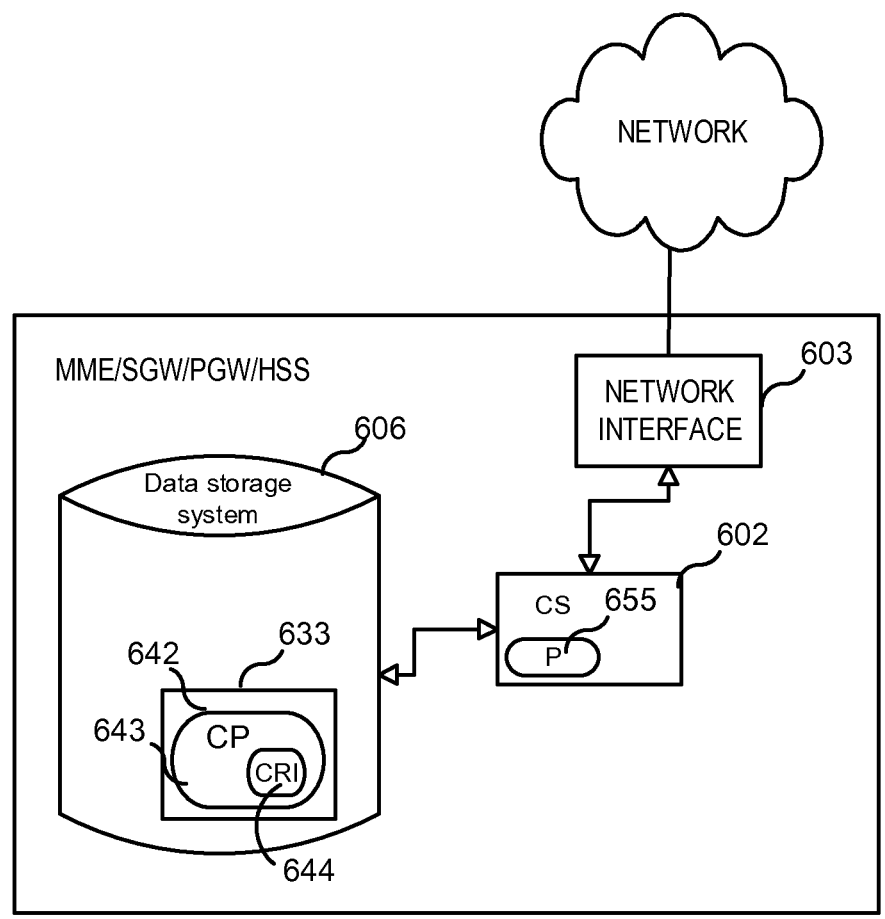
FIG. 6 is an exemplary diagram of a network node.

FIG. 6 is a block diagram of an embodiment of network node such as control node 108, MME, SGW, and PGW. As shown in FIG. 6, the network node may include or consist of: a computer system (CS) 602, which may include one or more processors 655 (e.g., a general purpose microprocessor) and/or one or more circuits, such as an application specific integrated circuit (ASIC), field-programmable gate arrays (FPGAs), a logic circuit, and the like; a network interface 603 for use in connecting the network node to a network; and a data storage system 606, which may include one or more non-volatile storage devices and/or one or more volatile storage devices (e.g., random access memory (RAM)). In embodiments where the network node includes a processor 655, a computer program product (CPP) 633 may be provided. CPP 633 includes or is a computer readable medium (CRM) 642 storing a computer program (CP) 643 comprising computer readable instructions (CRI) 644. CRM 642 is a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 644 of computer program 643 is configured such that when executed by computer system 602, the CRI causes the network node to perform steps described above (e.g., steps described above with reference to the flow charts and message flows shown in the drawings). In other embodiments, the network node may be configured to perform steps described herein without the need for a computer program. That is, for example, computer system 602 may consist merely of one or more ASICs. Hence, the features of the embodiments described herein may be implemented in hardware and/or software.

Figure 7:
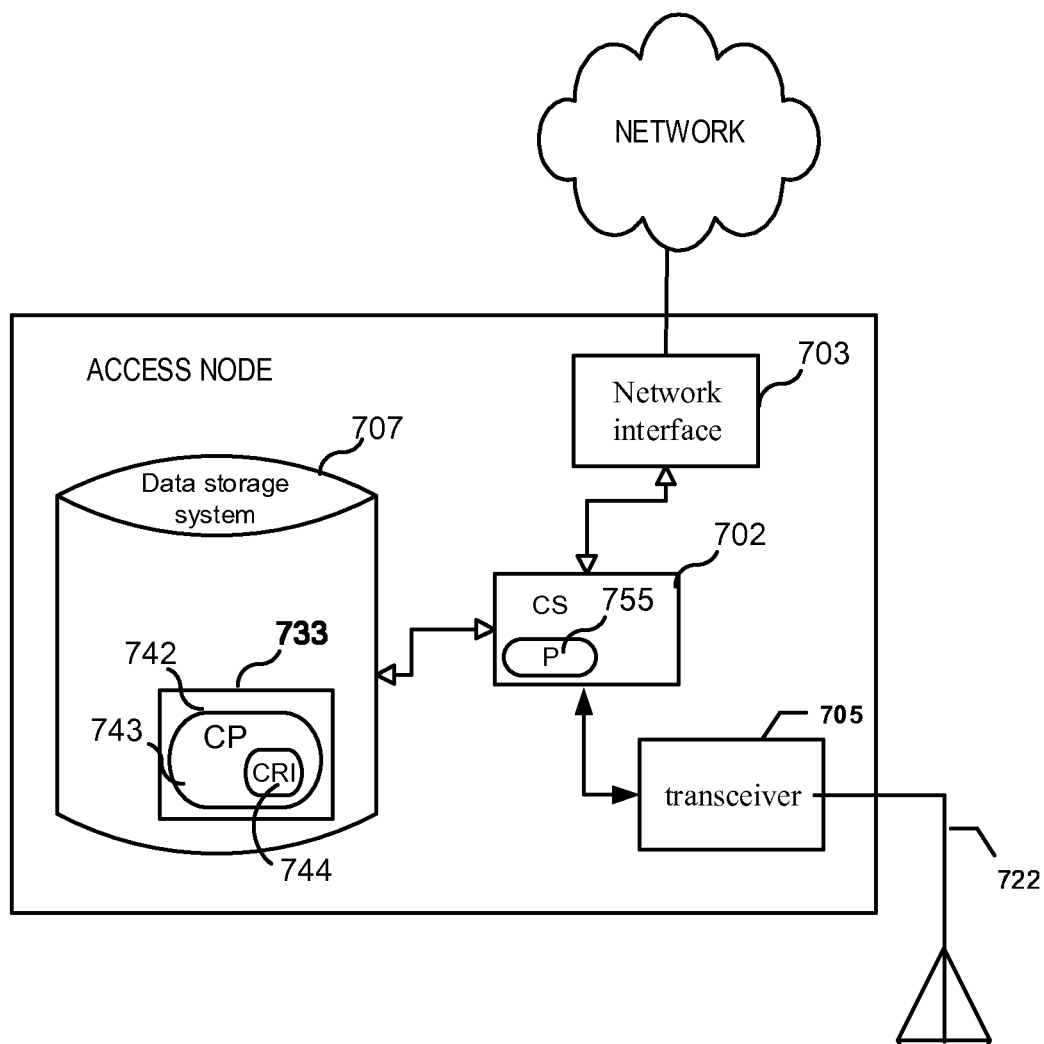
FIG. 7 is an exemplary diagram of an access node

FIG. 7 illustrates a block diagram of an exemplary access node, such as node 104 shown in FIG. 1. As shown in FIG. 7, the access node 104 may include: a data processing system 702, which may include one or more microprocessors and/or one or more circuits, such as an application specific integrated circuit (ASIC), field-programmable gate arrays (FPGAs), and the like; a network interface 710; a transceiver 704, and a data storage system 706, which may include one or more non-volatile storage devices and/or one or more volatile storage devices (e.g., random access memory (RAM)). According to some embodiments, the data processing system 702 may comprise a control unit used for selection of transmission parameters.

In embodiments where data processing system 702 includes a microprocessor, computer readable program code (CRPC) 708 may be stored in a non-transitory computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 602 to perform steps described above (e.g., steps described above with reference to the flow charts and message flows shown in the drawings and described above). In other embodiments, the access node 104 is configured to perform steps described herein without the need for code. That is, for example, data processing system 702 may consist merely of one or more ASICs. Hence, the features of the embodiments described herein may be implemented in hardware and/or software. For example, in particular embodiments, the functional components of the nodes described above may be implemented by data processing system 702 executing computer instructions, by data processing system 702 operating independent of any computer instructions, or by any suitable combination of hardware and/or software.

Figure 8:
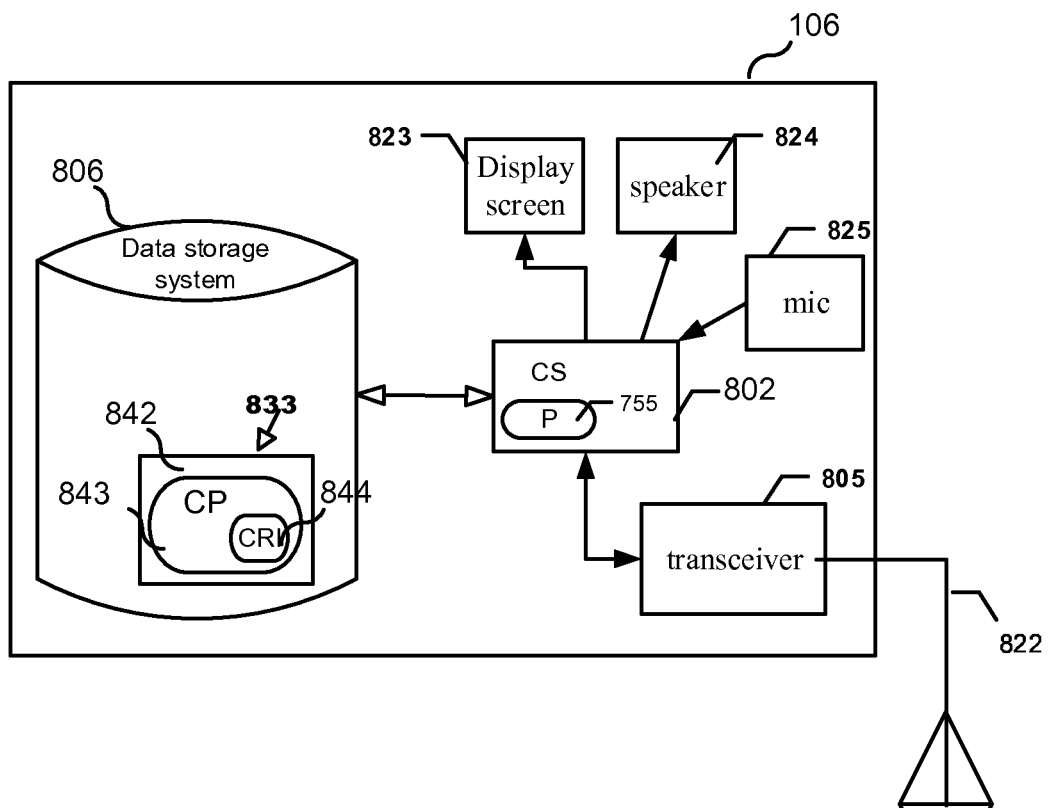
FIG. 8 is an exemplary diagram of a wireless communication device.

FIG. 8 is a block diagram of wireless communication device, such as a UE, according to some embodiments. As shown in FIG. 8, the device may include or consist of: a computer system (CS) 802, which may include one or more processors 855 (e.g., a general purpose microprocessor) and/or one or more circuits, such as an application specific integrated circuit (ASIC), field-programmable gate arrays (FPGAs), a logic circuit, and the like; a transceiver 805, coupled to an antenna, 822 for transmitting and receiving data wireless; and a data storage system 806, which may include one or more non-volatile storage devices and/or one or more volatile storage devices (e.g., random access memory (RAM)). In embodiments where the device includes a processor 855, a computer program product (CPP) 833 may be provided. CPP 833 includes or is a computer readable medium (CRM) 842 storing a computer program (CP) 843 comprising computer readable instructions (CRI) 844. CRM 842 is a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 844 of computer program 843 is configured such that when executed by computer system 802, the CRI causes the device to perform steps described above (e.g., steps described above with reference to the flow charts and message flows shown in the drawings). In other embodiments, the device may be configured to perform steps described herein without the need for a computer program. That is, for example, computer system 802 may consist merely of one or more ASICs. Hence, the features of the embodiments described herein may be implemented in hardware and/or software. As shown in FIG. 8, the device may include: a display screen 833, a speaker 824, and a microphone ("mic"), all of which are coupled to CS 802.

Advantages of the embodiments disclosed herein include, but are not limited to, reducing unnecessary user plane setup, reducing UE power consumption, and reducing wasting of resources.

Concise Description of Some Embodiments

A1. A method performed in a communications network, the method comprising:
receiving, from a user equipment (UE), an indication including the EBI the UE has determined to use for a pending uplink (UL) of user data, wherein the indication indicates a preference of the UE to use an existing CP connection or to establish a UP connection for the pending UL of user data and wherein the indication is included in a Tracking Area Update (TAU) request initiated by the UE;
determining, in response to receiving the indication, that the UP connection does not need to be established and that the existing CP connection may be used; and
in response to determining that the existing CP connection may be used, allowing the UE to send the pending UL of user data on the existing CP connection.
A2. The method according to A1, where the determining step is based in part on the indication including the EBI the UE has determined to use for a pending UL of user data.
A3. The method according to A1, where the determining step is based in part on a history of prior user data uplinks from the UE.
A4. The method according to A1, wherein allowing the UE to send the pending UL of user data on the existing CP connection comprises sending an indication to the UE that the existing CP connection may be used.
A5. The method according to A4, wherein the indication to the UE is included in a TAU Accept message.
A6. The method according to A1, wherein the indication indicates the preference of the UE based on the absence of an active flag input.
A7. The method according to A1, wherein the indication indicates the preference of the UE based on the presence of an active flag input.
A8. The method according to A1, wherein the indication indicates the preference of the UE based on a Boolean value.

A9. The method according to A1, wherein the indication indicates the preference of the UE based on an explicit value identifying either the existing CP connection or the UP connection.

A10. A method performed in a communications network, the method comprising:
receiving, from a user equipment (UE), an indication that indicates the EBI the UE prefers using for a pending uplink (UL) of user data, wherein the indication is included in a Tracking Area Update (TAU) request initiated by the UE;
determining, in response to receiving the indication, that a UP connection needs to be established; and
in response to determining that the UP connection needs to be established, establishing the UP connection and allowing the UE to send the pending UL of user data on the established UP connection.

A11. The method according to A10, where the determining step is based in part on the indication including the EBI the UE has determined to use for a pending UL of user data.

A12. The method according to A10, where the determining step is based in part on a history of prior user data uplinks from the UE.

A13. The method according to A10, wherein allowing the UE to send the pending UL of user data on the established UP connection comprises sending an indication to the UE that the established UP connection may be used.

A14. The method according to A10, wherein the indication to the UE is included in a TAU Accept message.

A15. The method according to A10, wherein the indication indicates the preference of the UE based on the absence of an active flag input.

A16. The method according to A10, wherein the indication indicates the preference of the UE based on the presence of an active flag input.

A17. The method according to A10, wherein the indication indicates the preference of the UE based on a Boolean value.

A18. The method according to A10, wherein the indication indicates the preference of the UE based on an explicit value identifying either the existing CP connection or the UP connection.

A19. A method performed in a user equipment (UE), the method comprising: preparing a TAU Request message including an indication including the EBI the UE has determined to use for a pending uplink (UL) of user data, wherein the indication indicates a preference of the UE to use an existing CP connection or to establish a UP connection for the pending UL of user data;
transmitting the TAU Request message;
in response to transmitting the TAU Request message, receiving a TAU Accept message;
determining whether to use the existing CP connection or the UP connection to send the pending UL of user data based at least in part on the TAU Accept message; and
sending the pending UL of user data.

A20. The method of claim A19, wherein the TAU Accept message includes an indication as to whether the existing CP connection or the UP connection is to be used, and wherein the determining whether to use the existing CP connection or the UP connection to send the pending UL of user data based at least in part on the TAU Accept message is further based on the indication as to whether the existing CP connection or the UP connection is to be used.

A21. The method of claim A19, wherein determining whether to use the existing CP connection or the UP connection to send the pending UL of user data based at least in part on the TAU Accept message includes determining to use the UP connection based on the UP connection being set up.

A22. The method of claim A19, wherein determining whether to use the existing CP connection or the UP connection to send the pending UL of user data based at least in part on the TAU Accept message includes determining to use the CP connection based on the UP connection not being set up.

A23. A control node, comprising:
a processor; and
a computer readable medium coupled to the processor, said computer readable medium containing instructions executable by the processor, whereby the control node is operative to:
receive, from a user equipment (UE), an indication including the EBI the UE has determined to use for a pending uplink (UL) of user data, wherein the indication indicates a preference of the UE to use an existing CP connection or to establish a UP connection for the pending UL of user data and wherein the indication is included in a Tracking Area Update (TAU) request initiated by the UE;
determine, in response to receiving the indication, that the UP connection does not need to be established and that the existing CP connection may be used; and
in response to determining that the existing CP connection may be used, allow the UE to send the pending UL of user data on the existing CP connection.

A24. A control node, comprising:
a processor; and
a computer readable medium coupled to the processor, said computer readable medium containing instructions executable by the processor, whereby the control node is operative to:
receive, from a user equipment (UE), an indication including the EBI the UE has determined to use for a pending uplink (UL) of user data, wherein the indication indicates a preference of the UE to use an existing CP connection or to establish a UP connection for the pending UL of user data and wherein the indication is included in a Tracking Area Update (TAU) request initiated by the UE;
determine, in response to receiving the indication, that the UP connection needs to be established; and
in response to determining that the UP connection needs to be established, establishing the UP connection and allowing the UE to send the pending UL of user data on the established UP connection.

A25. A User Equipment (UE), comprising:
a processor; and
a computer readable medium coupled to the processor, said computer readable medium containing instructions executable by the processor, whereby the UE is operative to:
prepare a TAU Request message including an indication including the EBI the UE has determined to use for a pending uplink (UL) of user data, wherein the indication indicates a preference of the UE to use an existing CP connection or to establish a UP connection for the pending UL of user data;
transmit the TAU Request message;
in response to transmitting the TAU Request message, receive a TAU Accept message;

determine whether to use the existing CP connection or the UP connection to send the pending UL of user data based at least in part on the TAU Accept message; and send the pending UL of user data.

Although terminology from 3GPP EPS has been used in this disclosure to exemplify the exemplary embodiments, one of ordinary skill in the art would understand this as not limiting the scope of the present embodiments to only the aforementioned system. Other wireless systems, including LTE, LTE-A, WiMax, UMB, HSPA and GSM, may also benefit from exploiting the ideas covered within this disclosure. Further, it is understood that the term node in this application can also be understood as entity.

Furthermore, the terminology such as NodeB and UE are non-limiting and in particular do not imply a certain hierarchical relation between the two; in general "NodeB" could be considered as device 1 and "UE" device 2, and these two devices communicate with each other over some radio channel.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that, although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

Abbreviations

EPC Evolved Packet Core
LTE Long Term Evolution
MTC Machine Type Communication
UE User Equipment
PGW Packet Data Network Gateway
SAE System Architecture Evolution
SGW Servicing Network Gateway
TAU Track Area Update
EPS Evolved Packet System
EBI EPS bearer identity
CP Control Plane
UP User Plane

The invention claimed is:

1. A method performed in a communications network, the method comprising:
   receiving from a user equipment (UE) an indication including an Evolved Packet System (EPS) bearer identity (EBI) the UE has determined to use for pending uplink (UL) user data, wherein the indication indicates a preference of the UE to use an existing control plane (CP) connection or to establish a user plane (UP) connection for the pending UL user data and wherein the indication is included in a Tracking Area Update (TAU) request initiated by the UE;
   based on (1) the indication and (2) whether the EBI is for (i) CP only, (ii) UP only, or (iii) CP or UP, determining at least one of whether the existing CP connection may be used or whether the UP connection needs to be established for the pending UL user data; and
   based on the determination, allowing the UE to send the pending UL user data using the existing CP connection or the UP connection.

2. The method of claim 1, where the determining is based in part on:
   the indication including the EBI the UE has determined to use for the pending UL user data, and/or
   a history of prior user data uplinks from the UE.

3. The method of claim 1, wherein allowing the UE to send the pending UL user data on the existing CP connection comprises sending an indication to the UE that the existing CP connection may be used.

4. The method of claim 3, wherein the indication to the UE is included in a TAU Accept message.

5. The method of claim 1, wherein the indication indicates the preference of the UE based on the absence or presence of an active flag input.

6. The method of claim 1, wherein the indication indicates the preference of the UE based on an explicit value identifying either the existing CP connection or the UP connection.

7. A method performed in a communications network, the method comprising:
   receiving from a user equipment (UE) an Evolved Packet System (EPS) bearer identity (EBI) included in a Tracking Area Update (TAU) request initiated by the UE;
   based at least in part on whether the EBI is for (i) CP only, (ii) UP only, or (iii) CP or UP, determining at least one of whether an existing control plane (CP) connection may be used or whether a user plane (UP) connection needs to be established for pending uplink (UL) user data; and
   based on the determination, allowing the UE to send the pending UL user data using the existing CP connection or the UP connection.

8. The method of claim 7, wherein
   the TAU request includes an indication indicating a preference of the UE to use the existing CP connection or to establish the UP connection for the pending UL user data, and
   the determining is based in part on:
      the indication including the EBI the UE has determined to use for the pending UL user data, and/or
      a history of prior user data uplinks from the UE.

9. The method according of claim 7, wherein allowing the UE to send the pending UL user data on the established UP connection comprises sending an indication to the UE that the established UP connection may be used.

10. The method of claim 9, wherein the indication to the UE is included in a TAU Accept message.

11. The method of claim 7, wherein
   the TAU request includes an indication indicating a preference of the UE to use the existing CP connection or to establish the UP connection for the pending UL user data, and
   the indication indicates the preference of the UE based on the presence or absence of an active flag input.

12. The method of claim 7, wherein
   the TAU request includes an indication indicating a preference of the UE to use the existing CP connection or to establish the UP connection for the pending UL user data, and
   the indication indicates the preference of the UE based on a Boolean value.

13. The method of claim 7, wherein
   the TAU request includes an indication indicating a preference of the UE to use the existing CP connection or to establish the UP connection for the pending UL user data, and
   the indication indicates the preference of the UE based on an explicit value identifying either the existing CP connection or the UP connection.

14. A method performed in a user equipment (UE), the method comprising:
   determining (i) not to include an active flag in a Tracking Area Update (TAU) Request message and (ii) to include in the TAU Request message an Evolved Packet System (EPS) bearer identity (EBI) the UE has determined to use for pending uplink (UL) user data;
   based on the determination, preparing the TAU Request message including an indication which (i) does not include the active flag and (ii) includes the EBI, wherein the combination of the lack of active flag and the EBI indicates a preference of the UE to use an existing control plane (CP) connection or to establish a user plane (UP) connection for the pending UL user data;
   transmitting the TAU Request message;

receiving a TAU Accept message, in response to transmitting the TAU Request message;
determining whether to use the existing CP connection or the UP connection to send the pending UL user data based at least in part on the TAU Accept message; and
sending the pending UL user data.

15. The method of claim 14, wherein the TAU Accept message includes an indication as to whether the existing CP connection or the UP connection is to be used, and wherein the determining whether to use the existing CP connection or the UP connection to send the pending UL user data based at least in part on the TAU Accept message is further based on the indication as to whether the existing CP connection or the UP connection is to be used.

16. The method of claim 14, wherein determining whether to use the existing CP connection or the UP connection to send the pending UL user data based at least in part on the TAU Accept message includes determining to use the UP connection based on the UP connection being set up.

17. The method of claim 14, wherein determining whether to use the existing CP connection or the UP connection to send the pending UL user data based at least in part on the TAU Accept message includes determining to use the CP connection based on the UP connection not being set up.

18. A control entity, the control entity comprising:
a processor; and
a computer readable medium coupled to the processor, said computer readable medium containing instructions executable by the processor, wherein the control entity is operative to:
receive from a user equipment (UE) an indication including an Evolved Packet System (EPS) bearer identity (EBI) the UE has determined to use for pending uplink (UL) user data, wherein the indication indicates a preference of the UE to use an existing control plane (CP) connection or to establish a user plane (UP) connection for the pending UL user data and wherein the indication is included in a Tracking Area Update (TAU) request initiated by the UE;
based on (1) the indication and (2) whether the EBI is for (i) CP only, (ii) UP only, or (iii) CP or UP, determine at least one of whether the existing CP connection may be used or whether the UP connection needs to be established for the pending UL user data; and
based on the determination, allow the UE to send the pending UL user data using the existing CP connection or the UP connection.

19. A User Equipment (UE), the UE comprising:
a processor; and
a computer readable medium coupled to the processor, said computer readable medium containing instructions executable by the processor, whereby the UE is operative to:
determinine (i) not to include an active flag in a Tracking Area Update (TAU) Request message and (ii) to include in the TAU Request message an Evolved Packet System (EPS) bearer identity (EBI) the UE has determined to use for pending uplink (UL) user data;
based on the determination, prepare the TAU Request message including an indication which (i) does not include the active flag and (ii) includes the EBI, wherein the combination of the lack of active flag and the EBI the indication indicates a preference of the UE to use an existing control plane (CP) connection or to establish a user plane (UP) connection for the pending UL user data;
transmit the TAU Request message;
receive a TAU Accept message responding to the TAU Request message;
determine whether to use the existing CP connection or the UP connection to send the pending UL user data based at least in part on the TAU Accept message; and
send the pending UL data.

20. The method of claim 1, wherein
the indication further comprises an active flag,
the combination of the active flag and the EBI indicates a preference of the UE to establish the UP connection for the pending UL user data,
the method further comprises:
if the EBI is for CP only, keeping a signaling connection or rasing a rejection or an error condition, and
if the EBI is for (i) UP only or (ii) CP or UP, estabslihing the UP connection.

21. The method of claim 1, wherein
the indication lacks an active flag,
the combination of the lack of active flag and the EBI indicates a preference of the UE to use the existing CP connection for the pending UL user data,
the method further comprises:
if the EBI is for CP only, keeping a signaling connection,
if the EBI is for UP only, establishing the UP connection, and
if the EBI is for CP or UP, deciding to use the existing CP connection or to establish the UP connection.

* * * * *